United States Patent [19]

Comer et al.

[11] Patent Number: 5,794,144
[45] Date of Patent: Aug. 11, 1998

[54] METHODS AND APPARATUS FOR COMMUNICATING DATA VIA A CELLULAR MOBILE RADIOTELEPHONE SYSTEM

[75] Inventors: Edward Irby Comer, Marietta; Peter Owen Roach, Jr., Atlanta, both of Ga.

[73] Assignee: Bellsouth Corporation, Atlanta, Ga.

[21] Appl. No.: 622,438

[22] Filed: Mar. 25, 1996

Related U.S. Application Data

[63] Continuation-in-part of Ser. No. 212,039, Mar. 11, 1994.

[51] Int. Cl.$^6$ .................................................. H04Q 7/24
[52] U.S. Cl. .................... 455/426; 455/426; 455/432; 455/412; 455/435
[58] Field of Search .................. 455/432, 426, 455/410, 412; 379/106.1

[56] References Cited

U.S. PATENT DOCUMENTS

| | | |
|---|---|---|
| 3,973,200 | 8/1976 | Akerberg . |
| 4,172,969 | 10/1979 | Levine et al. . |
| 4,263,480 | 4/1981 | Levine . |
| 4,644,351 | 2/1987 | Zabarsky et al. . |
| 4,646,082 | 2/1987 | Engel et al. . |
| 4,750,197 | 6/1988 | Denekamp et al. . |
| 4,814,763 | 3/1989 | Nelson et al. . |
| 4,823,123 | 4/1989 | Siwiak . |
| 4,825,193 | 4/1989 | Siwiak et al. . |
| 4,825,457 | 4/1989 | Lebowitz et al. . |
| 4,837,800 | 6/1989 | Freeburg et al. . |
| 4,868,560 | 9/1989 | Oliwa et al. . |
| 4,875,038 | 10/1989 | Siwiak et al. . |
| 4,882,579 | 11/1989 | Siwiak et al. . |
| 4,891,637 | 1/1990 | Siwiak et al. . |
| 4,914,651 | 4/1990 | Lusignan . |
| 4,928,086 | 5/1990 | Leonardo et al. . |
| 4,940,963 | 7/1990 | Gutman et al. . |
| 4,993,059 | 2/1991 | Smith et al. . |
| 5,005,014 | 4/1991 | Jasinski et al. . |
| 5,047,763 | 9/1991 | Kuznicki et al. . |
| 5,117,449 | 5/1992 | Metroka et al. . |
| 5,124,697 | 6/1992 | Moore . |
| 5,142,279 | 8/1992 | Jasinski et al. . |
| 5,148,473 | 9/1992 | Freeland et al. . |
| 5,153,582 | 10/1992 | Davis . |
| 5,153,903 | 10/1992 | Eastmond et al. . |
| 5,159,625 | 10/1992 | Zicker . |
| 5,162,790 | 11/1992 | Jasinski . |
| 5,175,758 | 12/1992 | Levanto et al. . |
| 5,222,123 | 6/1993 | Brown et al. . |
| 5,239,294 | 8/1993 | Flanders et al. . |
| 5,239,678 | 8/1993 | Grube et al. . |

(List continued on next page.)

FOREIGN PATENT DOCUMENTS

WO 95/24791  9/1995  WIPO .

*Primary Examiner*—Dwayne D. Bost
*Assistant Examiner*—Jean A. Getin
*Attorney, Agent, or Firm*—Jones & Askew, LLP

[57] ABSTRACT

A system for communicating data via a cellular network control channel of a cellular mobile radiotelephone system (CMR). A data message system includes reporting devices, a mobile switching center (MSC) of a CMR system, and a data collection system. The MSC receives data messages via the cellular network control channel from reporting devices operating within coverage areas of the array of cells and forwards the data messages via a first communications link to the data collection system. A paging acknowledgment system also can communicate both (1) paging messages and (2) acknowledgment messages to confirm reception of the paging messages. The paging acknowledgment system includes a communications system, remote communications devices, and at least one MSC of a CMR system. A remote communications device responds to a data message corresponding to a paging message by transmitting an acknowledgment message containing an acknowledgment code to the MSC via a cellular network control channel of the CMR system. In response, the MSC forwards the acknowledgment message to the communications system.

37 Claims, 9 Drawing Sheets

U.S. PATENT DOCUMENTS

| | | |
|---|---|---|
| 5,307,399 | 4/1994 | Dai et al. . |
| 5,307,509 | 4/1994 | Michalon et al. . |
| 5,341,410 | 8/1994 | Aron et al. . |
| 5,382,970 | 1/1995 | Kiefl . |
| 5,396,539 | 3/1995 | Slekys et al. . |
| 5,404,392 | 4/1995 | Miller et al. . |
| 5,454,027 | 9/1995 | Kennedy et al. . |
| 5,502,761 | 3/1996 | Duncan et al. ............... 455/412 |
| 5,526,401 | 6/1996 | Roach et al. ................ 455/426 |
| 5,539,810 | 7/1996 | Kennedy, III et al. . |
| 5,544,223 | 8/1996 | Robbins et al. .............. 455/426 |
| 5,544,225 | 8/1996 | Kennedy, III et al. ........ 455/412 |
| 5,546,444 | 8/1996 | Roach, Jr. et al. ............ 455/426 |
| 5,594,740 | 1/1997 | LaDue . |

METHODS AND APPARATUS FOR COMMUNICATING DATA VIA A CELLULAR MOBILE RADIOTELEPHONE SYSTEM

RELATED APPLICATION

This is a continuation-in-part of application Ser. No. 08/212,039, filed Mar. 11, 1994, and is related to application Ser. No. 08/331,794, filed Oct. 31, 1994, which is a division of application Ser. No. 08/212,039.

TECHNICAL FIELD

The present invention relates generally to data communications systems and more particularly relates to a method and apparatus for communicating data via a cellular network control channel of a cellular mobile radiotelephone system.

BACKGROUND OF THE INVENTION

In recent years, the communications industry has shown a growing interest in various types of wireless communications systems for communicating voice and/or data between numerous remote sites and a central location. It is well recognized that the use of a dedicated telephone facility for a conventional telephone system is not a convenient or economical option for all communications applications. For example, individuals who must be away from their base of operations have a need to conveniently and efficiently communicate with their base. Likewise, for many industrial applications, a central data collection site has a need for acquiring information from a variety of remotely located monitoring devices that collect data about the operation or performance of equipment. To overcome the limitations of the conventional telephone system, a two-way wireless communications link is often necessary to permit a response to a communication initiated from another location. In an attempt to solve the problem of supplying a response to an initial communication, the industry has offered various wireless communications systems, including two-way radios, mobile radiotelephones, and paging systems.

A conventional radio communications system uses a base station transceiver located at a site for favorable radio propagation and a set of transceivers typically located in vehicles, such as for police or trucking dispatching systems, or at remote equipment sites that communicate data in response to a command signal from the base station transceiver. Most radio communications systems are useful for conducting communications between short distances, such as within the boundaries of a town or city, via a very high frequency (VHF) radio link.

Although conventional radio communications systems are useful for specialized communications applications, two-way radios are not widely accepted for general purpose communications. The use of two-way radios is generally regulated by the Federal Communications Commission (FCC) and the allocated frequency spectrum is relatively limited. Furthermore, the quality of communications is subject to the propagation conditions between communications sites. Two-way radio equipment is generally large and heavy and, as a result, is unlikely to be carried by a user at all times or to be installed in small or existing equipment.

Another form of two-way communications is a cellular mobile radiotelephone (CMR) system, which is connected to the extensive public switched telephone network (PSTN) and permits communications between a mobile radiotelephone user and anyone with a conventional telephone (or another radiotelephone). Typical CMR systems are characterized by dividing a radio coverage area into smaller coverage areas or "cell" using low power transmitters and coverage-restricted receivers. As shown in U.S. Pat. Nos. 3,906,166 and 4,268,722, the limited coverage area enables the radio channels used in one cell to be reused in another cell. As a cellular mobile radiotelephone within one cell moves across the boundary of the cell and into an adjacent cell, control circuitry associated with the cells detects that the signal strength of the radiotelephone in the just-entered cell is stronger, and communications with the radiotelephone are "handed-off" to the just-entered cell. Thus, a CMR system can supply two-way communications for an array of cells, thereby supplying communications for a much wider area than conventional two-way radios.

Conventional radiotelephones generally offer both voice and data communications capabilities and, accordingly, the radiotelephone service is generally supplied at a cost that is commensurate with the combined voice and data services. Nevertheless, this combination of both voice and data communications may exceed a user's requirement for communicating by only voice or data. In addition, real-time voice or data communications is not always desirable by a user who wishes only to receive a message without having a current activity disturbed. Similar to two-way radios, the frequency spectrum for the CMR system radio channels, particularly voice channels, is a limited resource.

Paging systems include pagers, which are miniature receivers, and at least one paging terminal having a transmitter that covers a selected geographic area containing numerous pagers. A pager is generally tuned to a particular tone or data bit-modulated radio frequency that is shared with many other pagers. A particular sequence of tones or data bits is used as an address or the identification of a selected pager. Reception of the particular sequence activates an acoustic, tactile, or visible alert, thereby indicating that a call has been placed to the paging terminal from a telephone connected to the PSTN and generally communicated via the transmitter to the pager. Depending upon the complexity of the pager, the paging device may receive a voice or a data message following the alert, or the alert alone may simply indicate to the user that a call was made and a prearranged action should be taken. This type of pager forms a one-way messaging system because it does not permit the party initiating the page to know if the page has actually been received by the addressed pager.

To respond to a page received via the conventional one-way paging system, the paged party typically must find an available conventional telephone and initiate a telephone call to the party that initiated the page. Alternatively, the paged party can place a responsive call by use of a mobile radiotelephone, if available. In recognition of this problem of separate pager and radiotelephone devices, U.S. Pat. No. 5,148,473 describes a pager and radiotelephone apparatus having the combination of a radio pager section and a cellular radiotelephone section. To answer a page, the user simply places a call via the CMR system. The pager also allows the user to screen incoming call to determine which of the received messages to return, thereby eliminating the CMR system service costs associated with unwanted calls. However, any acknowledgment of a received page by this apparatus requires use of the relatively limited spectrum for voice channels of the CMR system.

Paging systems having two-way communications capability for receiving a page and transmitting an acknowledge receipt of a page are also known. One such system enables a pager having acknowledgment capability to immediately communicate a response to the calling party after receiving the initial page contact. The response may be a voice, numeric, or alphanumeric message informing the originator of the page communication that the message was successfully received by the page, and may further offer a reply to the received message. This page acknowledgment system generally includes a single central transmitter covering a certain geographic area and one or more acknowledgment system receivers for receiving acknowledgment signals from the pagers. The acknowledgment system receivers can communicate acknowledgment messages to the central transmitter via either a wire or wireless link. The number of acknowledgment system receivers is a function of the transmitting power of the acknowledgment transmitter associated with each of the pagers. The transmitter power of pagers is generally low, typically less than one watt, based upon the requirement for portability of the pager and the necessity to minimize the size of the battery for powering the transmitter. Such paging acknowledgment systems are most useful for local area "on-site" communications systems in view of the power limitations of the transmitters associated with the pagers.

Present paging acknowledgment systems require a large capital investment for the purchase and installation of equipment to implement a two-way communications system that covers a wide communications area because the number of acknowledgment receivers (and transmitters) in a paging acknowledgment system is a function of the limited transmitting power of the transmitter associated with each of the pagers. Although the paging industry is interested in supplying a page acknowledgment to subscribers of paging services, the cost of implementing the paging acknowledgment system has discouraged many service providers from installing such paging acknowledgment systems.

Accordingly, there is a need to overcome the limitations of the prior art by adapting an existing communications network to communicate data between a central location and numerous remote sites. There is a further need to adapt an existing communications network to deliver the acknowledgment of a message. This new use of an existing communications system should have a minimum impact upon present communications carried by the system. The present invention adapts the existing architecture of a CMR system in a efficient and cost-effective manner to support data communications via the CMR system, including the collection and reporting of data recorded at remote sites and the acknowledgment of a page message.

SUMMARY OF THE INVENTION

The present invention solves the problems of the prior art by providing an apparatus and method for communicating data via a cellular network control channel of a CMR system. Telecommunications service suppliers, including a company related to the assignee of this application, Bell-South Mobility, have already installed the necessary equipment to support nationwide communications via CMR networks. The inventors have recognized that the CMR system is an existing communications architecture which can be adapted in a novel manner to supply either one or two-way data communications with minimal impact upon the well known voice communications offered by the cellular mobile radiotelephone network. The present invention takes advantage of this installed base of communication equipment by using the control channel of the CMR system for data communications between a central location and numerous remote sites. In this manner, the present invention conserves the valuable frequency spectrum allocated for the voice channels that support normal telephone conversations on the CMR system.

Briefly described, the present invention is a data message system for communicating data collected from remote data sources. The data message system includes sets of data reporting devices, at least one mobile switching center (MSC) of a CMR system, and a data collection system connected to the MSC. Each data reporting device includes a monitor and a cellular communications device. The monitor, which is connected to a remote data source, monitors the operation of the remote data source to obtain selected data. The cellular communications device is connected to a corresponding monitor and, in response to selected data, transmits a data message containing the selected data. The MSC receives data messages via a cellular network control channel of the CMR system from the cellular communications devices operating within coverage areas of the CMR system. In turn, the MSC sends the data messages to the data collection system via a first communications link. The data collection system, which is connected to a memory storage device, stores each data message and thereafter processes the stored data messages. The data collection system can accept data communications that are compatible with EIA/TIA Interim Standard 41 (IS-41) or any other vendor proprietary protocol.

The data collection system also can transmit the stored data message to a data processing system via a second communications link. The data processing system, which also operates to store and/or process the contents of the data message, is typically located at a site remote from the data collection system. This permits processing of selected data at a central location that is more convenient for the user, rather than conducting such operations at the location for the data collection system. Although the data collection system and the data processing system are typically located at separate sites, the operations of the data collection and the data processing system also can be combined or otherwise integrated by installing those systems at the same physical location.

By use of the present invention, selected data acquired from various remote sites can be communicated to a single location. The data sources typically include utility meters, community antenna television (CATV) pay-per-view (PPV) terminals, vending equipment, and security alarm systems. The selected data describes certain parameters of operation or performance by each of the data sources. For example, if the data source is an electrical utility meter located proximate to the consumer's location, then a utility can obtain parameters, such as the power demand for a certain time interval, recorded by a monitor connected to the source and communicated via the control channel of the CMR system.

More particularly described, the monitor includes a recorder for recording the selected data during at least one predetermined time period. The recorder can add to the selected data a time tag indicating the relative time for the start of the predetermined time period. The use of the time tag permits correlation of the selected data to a specific time, thereby assisting processing of the collected data at a later date.

The cellular communications device, which can be implemented as a cellular radiotelephone transceiver, transmits the selected data to the MSC in a data-type format via the control channel of the CMR system. This conserves the use of the frequency spectrum associated with the voice channel of the CMR system and avoids interfering with call traffic on the voice channel. The data transmission by the cellular communications device can be initiated in response to a status signal output by the monitor. This status signal indicates that the monitor has recorded selected data from the data source and, based upon completion of this data collection operation, prompts the cellular communications device to transmit the stored selected data.

To minimize interference to normal control operations on the control channel, the cellular communications device typically transmits the selected data during certain off-peak times of operation for the CMR system. Specifically, the cellular communications device monitors the cellular network control channel to detect a stream of busy idle bits. The status of each of the busy idle bits indicates whether at least one cellular source has initiated a cellular communication with the MSC via the cellular network control channel during a particular time period. A busy idle bit set to the binary value of one indicates that the control channel is busy. Based upon the status of each of the busy idle bits transmitted during a selected time period, the cellular communications device determines the level of communications activity on the cellular network control channel. The cellular communications device transmits the data message to the MSC during a "window of opportunity" when the results of this monitoring operation indicate that the communications on the control channel have been at a level which would permit a data transmission on a noninterference basis.

Alternatively, the cellular communications device can transmit the data message at a selected time period that represents a desirable time for such communications, such as the early morning hours when call traffic on the CMR system is normally at a low level. The cellular communications device includes a clock that outputs a clock signal upon expiration of a time interval, which is a time that is typically associated with minimal cellular call activity. In response to the clock signal, the cellular communications device transmits a data message containing previously stored selected data to the MSC via the cellular network control channel. In this manner, the cellular communications device can be programmed to transmit during off-peak usage times for the CMR system, thereby minimizing interference to the control operations conducted by the CMR system over the control channel.

The cellular communications device also can conduct selected operations in response to receiving command signals from the MSC via the cellular network control channel. The command signals comprise address data, and each of the cellular communications devices is responsive to the command signals only for particular address data. The cellular communications device transmits a data message to the MSC via the cellular network control channel in response to receiving a selected command signal. In response to receiving another command signal, the cellular communications device also outputs an instruction signal to prompt a data recording operation by its corresponding monitor. In turn, the monitor monitors the operations of the remote data source and obtains selected data for a certain monitoring time period. Furthermore, the time interval for the clock of the cellular communications device also can be set to a certain time in response to receiving yet another command signal.

The data message comprises selected data and a predetermined identifying characteristic that uniquely identifies the cellular communications device which transmits the data message to the MSC. The data message is formatted to correspond to a call origination signal, which is normally transmitted by a cellular radiotelephone unit when the device originates a cellular telephone call for communication via a CMR system. In this manner, the cellular radiotelephone can request a voice channel via the MSC for completing a cellular communication. The call origination signal, by convention, normally comprises separate data fields containing a mobile telephone number identifying the originating unit and an electronic serial number (ESN). The call origination signal is similar to a registration signal, with the exception that the call origination signal also can include a data field containing the telephone number of the called party and a flag for designating the signal as a call origination signal.

For the present invention, the predetermined identifying characteristic of the data message is inserted within a data field that represents the mobile telephone number and the selected data is inserted within a data field that represents the ESN. Each cellular communications device is assigned a different predetermined identifying characteristic, which can be a conventional telephone number, a selected 10-digit number, or at least a portion of a mobile telephone number [XXX XXXXXXX], such as a mobile telephone number belonging to a set of unassigned mobile telephone numbers of the CMR system. As an option, selected data can also be placed within the called party data field. Accordingly, the selected data is communicated via the control channel of the CMR system when the cellular communications device appears to "originate" a cellular call by sending the formatted data message to the MSC.

For another aspect of the present invention, a paging acknowledgment system is provided for communicating both (1) paging messages and (2) acknowledgment messages to confirm reception of the paging messages. The paging acknowledgment system uses the cellular network control channel of the CMR system for communicating an acknowledgment message, which verifies receipt of a paging message, to an acknowledgment message collection site.

The paging acknowledgment system includes a communications system, a set of remote communications devices, and at least one MSC of a CMR system. In response to a paging message from a paging party, the communications system prepares a data message corresponding to the paging message. The data message can contain an address that uniquely identifies a selected remote communications device, an acknowledgment code that uniquely identifies the corresponding paging message, and paging data intended for communication to a user or subscriber associated with the selected remote communications device. This acknowledgment code is stored by the communications system to enable the later use of this stored data to support a determination of whether the data message has been properly acknowledged by the selected remote communications device. The communications system thereafter transmits the data message via a communications network, such as a conventional paging network, to a selected remote communications device. Typically, the data message is forwarded via a paging terminal to the selected remote communications device.

A remote communications device responds to a data message containing its particular address by preparing and transmitting an acknowledgment message to the MSC via a cellular network control channel of the CMR system. The acknowledgment message contains the acknowledgment code to indicate a valid reception of the data message. As an option, the acknowledgment message also can contain responsive operation data input by the user to respond to the paging data or supplied by equipment connected to the remote communications unit. The operation data can be either manually or automatically input to the remote communications device for eventual transmission via the CMR system.

The MSC communicates via the cellular network control channel with the remote communications devices operating within a cell of the CMR system. In response to the acknowledgment message, the MSC recognizes that the message is associated with a remote or foreign CMR system. Accordingly, the MSC transmits the acknowledgment message to the appropriate remote CMR system, which is represented by the communications system. The communications system determines that the acknowledgment message contains an acknowledgment code.

In response to the acknowledgment message, the communications system processes the acknowledgment message and determines whether the acknowledgment message corresponds to a particular one of the data messages. This determination is made by comparing the acknowledgment code in the acknowledgment message to the stored acknowledgment codes associated with data messages. If a match is made, then the acknowledgment can be stored or supplied to the paging party.

The acknowledgment message can include the acknowledgment code and, as an option, operation data intended for communication to the paging party. The acknowledgment message is formatted to correspond to a call origination signal for initiating a cellular communication within a CMR system. Thus, the acknowledgment code is inserted within the data field that normally is filled with the mobile telephone number and the operation data is inserted within the data field normally filled by the ESN. Operation data also can be placed within the called party data field. Each acknowledgment code uniquely identifies a paging message and can be a conventional telephone number, a selected 10 digit number, or at least a portion of a mobile telephone number. Accordingly, the acknowledgment code (and the operation data) is communicated via the control channel of the CMR system when the remote communications device appears to "originate" a cellular call by forwarding a formatted data message to the MSC.

In view of the foregoing, it is an object and advantage of the present invention to provide a data message system for communicating data acquired from remote sites to a central location via a cellular network control channel of a CMR system.

It is another object and advantage of the present invention to adapt the existing equipment of a CMR system to implement a data message system for communicating data via a cellular network control channel of the CMR system.

It is another object and advantage of the present invention to provide a paging acknowledgment system for communicating via a cellular network control channel of a CMR system an acknowledgment message that is responsive to the reception of a paging message.

It is another object and advantage of the present invention to adapt the existing equipment of a CMR system to implement a paging acknowledgment system for communicating via a cellular network control channel of the CMR system an acknowledgment message that is responsive to the reception of a paging message.

These and other objects, features, and advantages of the present invention may be more clearly understood and appreciated from a review of the following detailed description and by reference to the appended drawings and claims.

DETAILED DESCRIPTION

Figure 1:
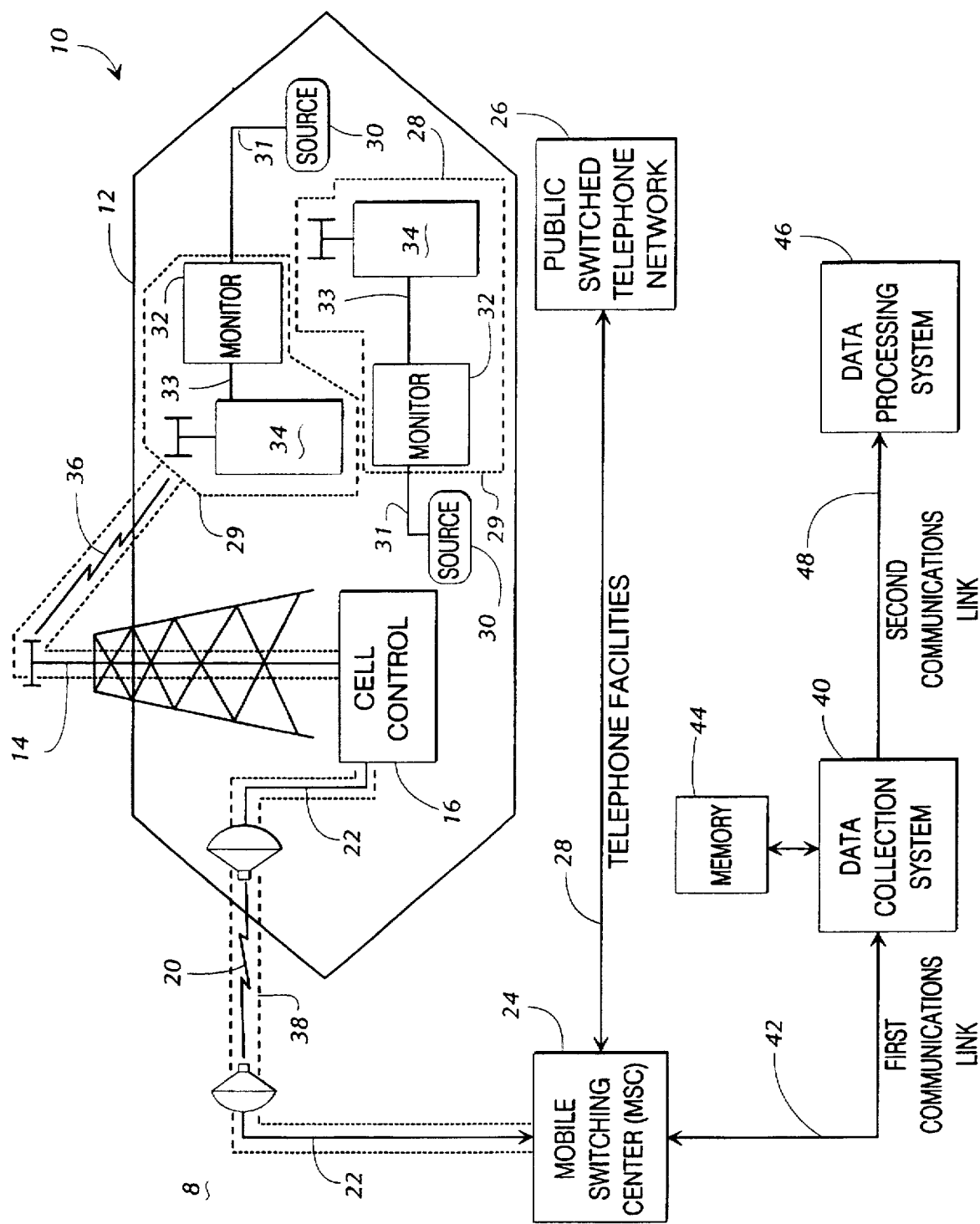
FIG. 1 is a block diagram of the preferred embodiment of a data message system in the operating environment of a CMR system.

The present invention provides a data message system for communicating data collected from remote data sources. The data message system includes a set of data reporting devices, at least one mobile switching center (MSC) of a cellular mobile radiotelephone system (CMR) system, and a data collection system connected to the MSC. Each data reporting device monitors the operation of the remote data source to obtain selected data. The data reporting device can transmit a data message containing the selected data to the MSC via a cellular network control channel of the CMR system. The MSC receives data messages from data reporting devices operating within coverage areas of the CMR system. The MSC can send the data messages to the data collection system via a first communications link for processing of the information offered by the data messages.

By operating within the environment of a CMR system, which is well adapted for portable or mobile communications, the present invention takes advantage of an existing wide area communications network and avoids the expense of communicating with each remote data site via a dedicated conventional telephone facility or conventional two-way radios. The data message system adapts the existing environment of a CMR system to communicate data from one or more remote sites to a central location. However, to conserve the use of voice channels of the CMR system for conventional telephone conversations, the data collection system uses the cellular network control channel of the CMR system for data communications. The data message is formatted to correspond to a call origination signal, which is normally transmitted by a cellular radiotelephone unit when the device originates a cellular telephone call for communication via a CMR system. This permits conservation of the valuable frequency spectrum dedicated to the voice channels of the typical CMR system.

In view of the foregoing, it will be understood that the present invention adapts the existing architecture and communications protocols for a conventional CMR system to supply a novel and economical approach to the communication of data collected from numerous remote sites. It will be further understood that the communication of data messages between an MSC and the cellular communications device is primarily based upon conventional techniques and known protocols for CMR system communications. Accordingly, prior to describing the embodiments of the present invention, it will be useful to first review the primary components and operation of a typical CMR system.

Cellular Mobile Radiotelephone System

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are "handed-off" to the just-entered cell.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises an FOCC for communications from the MSC to a radiotelephone unit and an RECC for communications from a radiotelephone unit to the MSC. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and the conventional radiotelephone is responsive to this instant snapshot of control channel activity.

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, NW., Washington, D.C., USA 20006.

It is known that when a cellular mobile radiotelephone originates a call, it transmits at least one data message to the serving cell of the CMR system. This request for a cellular voice channel, commonly referred to as a Call Origination function, is defined by EIA/TIA-553 and can be implemented as a message or signal having certain defined fields. For example, this call origination message can contain data fields for the low order seven digits of the unit's telephone number, known as the Mobile Identification Number (MIN), the unit's Station Class Mark (SCM), which identifies functional characteristics of the unit, and the Called Address, or dialed telephone number. Cellular system operators typically also require additional data words to be transmitted within a call origination message, including the MIN2, which is the high order three digits or NPA of the cellular unit's telephone number, and the Electronic Serial Number (ESN).

The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

The call origination message is provided first to the serving cell of the CMR system, and then through a data link to a mobile telephone switching center, otherwise described as a mobile switching center. The MSC, also known as a "switch," makes voice connections between mobile radiotelephones and other telecommunications networks. At the MSC, a determination is typically made whether the radiotelephone identified by the message is an authorized user or subscriber by looking up the unit's telephone number, serial number, and other information supplied by the message to see if there is an entry in the MSC's database corresponding to that particular telephone. An optional function of an MSC is to validate that the ESN and MIN received as part of a call origination message are valid. If the MIN is valid and the radiotelephone is identified as a subscriber within the given cellular system, i.e., a "home" unit, the MSC compares the received ESN to a database entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as Autonomous Registration by supplying a data packet of information similar to that of a call origination message. The autonomous registration signal, also referred to as a registration or an identification signal, typically comprises data fields for at least a mobile telephone number, i.e., the MIN, and an ESN. Unlike the autonomous registration signal, the call origination signal can include a data field containing the digits of the telephone number to be called, and a flag within a data field to distinguish this message from a registration signal.

The original design attempt of Autonomous Registration was to improve the efficiency of potential future call deliveries by keeping the MSC informed of the approximate whereabouts of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, the Autonomous Registration function is implemented as messages periodically and autonomously sent from the mobile radio- telephone to the serving cell at an interval specified in data parameters previously received from the cell by the cellular unit.

A subscriber using or attempting to use his or her mobile radiotelephone in a service area outside the home service area is said to be "roaming," and he or she (and the associated mobile radiotelephone unit) is commonly referred to as a "roamer." For example, if a subscriber enters the service area of another CMR system service provider and powers on the radiotelephone, the radiotelephone will subsequently receive a message via the control channel of the particular cell in which the telephone then resides. This message will include a request that the subscriber register for operation in the particular cellular system. In response, both the mobile telephone number and the serial number for the radiotelephone unit are transmitted as identifying information back to the cell site. The cell forwards this information to a mobile switching center, which quickly ascertains whether the radiotelephone unit is a customer of the local cellular service provider or the customer of another cellular system.

If the radiotelephone unit is a customer of another cellular service provider, the mobile switching center will send a message packet to the home system for the particular telephone unit. This message indicates that the particular radio telephone unit has registered in another cellular system and requests information about the validity of the number and account information for the radio telephone unit. The home system responds by transmitting a responsive packet containing the requested information. If valid, the mobile switching center at the foreign cellular system will then add the roamer to its list of registered users and the home cellular system will add the subscriber associated with the radio telephone unit to a list of roamers that are out of the service area and registered in another area.

When this same radiotelephone unit registers with yet another system, the database at the mobile switching center for the home system will observe that the unit has moved again and will update its list of where the roaming unit has most recently registered in a database system. In addition, it will send a message to the first foreign system informing it that the roaming unit has now moved on and registered in another system, and that the first foreign system should delete the particular unit from its list of registered roamers. In this manner, the databases at the various mobile switching centers are not cluttered with data identifying previously registered roamers as valid accounts to whom service should be provided, when these roamers may have long since left the area of service.

Data Message System

Referring now to the drawings, in which like numerals indicate like elements throughout the various figures, FIG. 1 illustrates the preferred embodiment of a data message system 10 in the preferred environment of a cellular mobile radiotelephone (CMR) system 8. Referring to FIG. 1, the data message system 10 supports the collection and communication of data to a central data collection site by reporting systems associated with numerous data sources. A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the mobile switching center (MSC) 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link such as the microwave link 20, located between the cell 12 and the MSC 24.

It is well known to those skilled in the art that the conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28.

The data collection system 10 includes a set of data reporting devices 29, each comprising at least one monitor 32 for collecting data from remote data sources 30 and a cellular communications device 34 for communicating the collected data via a control channel of the CMR system to the MSC 24. The monitor 32, which is connected to a corresponding remote data source 30 via a signal path 31, obtains and records selected data directed to the operation or performance characteristics of the data source 30. In turn, the cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 receives the data message via a cellular network control channel 38 formed by the combination of the data link 22 and a cellular communications link 36 between the broadcast antenna 14 and the cellular communications device 34. This combination of communications links is collectively referred to as the control channel. It is well known that a cellular network control channel for a conventional CMR system comprises two radio channels that are commonly described as a forward control channel (FOCC) and a reverse control channel (RECC). The FOCC is used for communications initiated by the MSC to a radiotelephone unit. In contrast, the RECC is used for communications from the radiotelephone to the MSC 24. The communications operations of the preferred embodiment also use this convention for communications between the MSC 24 and the cellular communications device 34. In particular, the control channel 38 comprises two separate data communications paths, an FOCC for communications initiated by the MSC 24 and an RECC for communications initiated by the cellular communications devices 34 (or mobile radiotelephones operating within the cell). Accordingly, the cellular communications device 34 transmits data messages via the RECC, whereas the MSC 24 transmits command signals via the FOCC.

In this manner, the MSC 24 can receive data messages from each of the cellular communication devices 34 operating within the coverage areas of an array of cells for the CMR system 8. Although the data messages contain selected data rather than the parameters normally contained in an actual radiotelephone control information, the MSC 24 will operate upon the data messages as if they were transmitted by a conventional cellular radiotelephone unit operating within the coverage area of the CMR system because the data messages are formatted to appear as a conventional call origination signal generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is preferably connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 can send the information of the data message to a data processing system 46 via a second communications link 48. The data processing system 46 is typically remotely located from the data collection system 40 and facilitates convenient processing of the selected data at a central site. The second communications link 48 is typically implemented by a conventional telephone facility, a dedicated data link, or by a wireless communications link.

The inventors foresee numerous communications applications for the data collection system 10, including communicating data collected from a wide variety of data sources, such as utility meters, community antenna television (CATV) pay-per-view (PPV) terminals, equipment operating at isolated sites, and security alarm systems.

A typical application for the data collection system 10 is to monitor the loads of an electrical load system and to communicate energy consumption data to a central site for processing. The utility industry typically determines the effectiveness of an electrical load management system for a selected control scenario by collecting or monitoring energy consumption data for certain customers during load management activities. In particular, the utility compares the maximum energy consumed by the selected customers for certain collection periods to the maximum energy that would be consumed by those customers in the absence of any load management activities. A utility typically uses a load profile recorder located proximate to each customer's electrical load for recording the customer's power consumption during predetermined time intervals. Upon the conclusion of the collection period, the recorded energy consumption data is then forwarded from each load profile recorder to a central data processing site for data translation and evaluation. It is well known to use a conventional telephone system to send energy consumption data recorded by the load profile recorder to the data processing site.

For this application, the monitor 32 operates as a load profile recorder to obtain the energy consumption data from the data source 30, in this case an electrical load. The cellular communications device 34 thereafter transmits a data message containing the energy consumption data to the MSC 24. The MSC 24 can then forward the data message to the data collection system 40 for processing of the energy consumption data or, in turn, the data collection system 40 sends the data message to the data processing system 46 for processing operations. In this manner, the utility can collect energy consumption data from numerous electrical loads to support the utility's evaluation of the effectiveness and cost benefit of its electrical load management program.

It is also well known to use a system for monitoring and communicating data pertinent to the commercial operation of a reporting system, such as a soft drink vending machine, to a central data collection site via a conventional telephone facility on a nondedicated basis, as shown in U.S. Pat. No. 4,766,548. Such systems permit the monitoring of various occurrences within vending machines, such as inventory changes, service calls, cash receipts, demand for certain products, sold-out conditions, and miscellaneous alarm functions. For this type of application, the monitor 32 monitors the commercial operations of the data source 30, in this case a vending machine, and the cellular communications device 34 transmits a data message containing the operation parameters to the MSC 24. Similar to the utility application, the MSC 24 can then forward the data message to the data collection system 40 for processing of the selected data. Alternatively, the data collection system 40 can respond by sending the data message to the data processing system 46 for processing operations.

It will be recognized that the data collection system 10 is useful for a wide variety of data collection and reporting activities and that the above-described examples are not intended to limit the scope of applications for the present invention.

Figure 2:
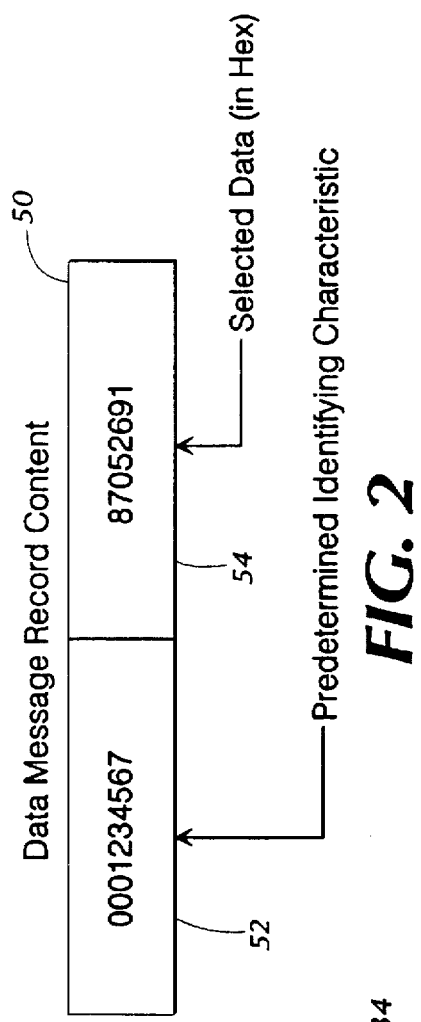
FIG. 2 is a table that shows the format for a data message communicated via the preferred embodiment of the data message system.

In view of the foregoing general information about cellular system operations, and referring still to FIG. 1, in response to the transmission of a data message by a cellular communications device 34, the MSC 24 typically makes a determination whether the cellular communications device 34 that transmitted the data message is an authorized user or subscriber of the services offered by the cellular system 8 or another system. As shown in FIG. 2, the data message, formatted as a call origination signal associated with the Call Origination function, preferably includes certain information that identifies the cellular communications device 34 as a radiotelephone unit which normally operates within a certain remote or "foreign" cellular system. Based upon this information, the MSC 24 decides that the cellular communications device 34 is a roamer because it appears to subscribe to the cellular service offered by another cellular system, which, in this case, is the data collection system 40.

The MSC 24 can maintain a list or database having entries corresponding to the identification information in the data message. At least a portion of the identification information identifies the source of the call origination signal as belonging to a particular cellular system. By checking this database, the MSC 24 determines whether the cellular communications device 34 is a subscriber or a roamer. A subscriber is typically listed as an entry in the database, whereas a roamer is generally not initially listed in the database. Thus, it will be understood that the MSC 24 interprets the data message as a transmission from a roaming mobile radiotelephone operating within the CMR system 8 because the database fails to contain an entry identifying the cellular source as a "home" unit.

The remote cellular system identified by the data message is preferably dedicated to data collection applications, rather than conventional voice communications, and is represented by the data collection system 40. This remote cellular system represents the home location register (HLR) for the cellular service responsible for transmission of the data message. In recognition that the cellular communications device 34 is actually associated with the remote cellular system, the MSC 24 forwards the data message to the data collection system 40 via the first communications link 42.

The data collection system 40 has now received the data message containing selected data collected from the remote data source 30 and, unlike the MSC 24, recognizes that the data message actually contains the desired data collected from a remote data source 30. Accordingly, the data collection system 40 transmits a message to the MSC 24 that instructs the MSC to delete the cellular communication device 34 from its list of registered roamers. It will be understood that the MSC 24 would normally receive this type of message when a roaming radiotelephone has moved to another cellular system and subsequently registered for operation on that other system. Thus, the database of the MSC 24 is no longer required to maintain the registration information concerning the cellular communications device 34 after transferring the data message to the data collection system 40.

Alternatively, the data collections system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a cellular communications device 34, is a valid cellular source.

In particular, the data collection system 40 recognizes that the received data message contains selected data which has been transmitted by a cellular communications device 34. Accordingly, the data collection system 40 processes the received data message and compares the predetermined identifying characteristic in its data message to a list of such characteristics in its database. This database preferably contains an entry of the predetermined identifying characteristic for each of the known cellular communications devices 34 and corresponding data that identifies the associated device as a valid cellular source. Upon obtaining a positive match, the data collection system 40 preferably responds to the received data message by sending to the MSC 24 a validation message. The validation message confirms that the roamer associated with the data message is a valid or authorized user of the remote cellular system. However, the data collection system 40 also advises the MSC 24 to not complete the requested call because there is no need to connect the cellular communications device 34 to a voice channel of the CMR system for completing a conventional voice-based telephone communication. Based on the valid user response, the cellular communications device 34 is thereafter added as a registered cellular source to a database of registered roamers at the MSC 24. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines the operations limitations for the cellular source, including access to long distance services, the capability for the source to only originate (and not receive) calls via the cellular system, etc. For the preferred embodiment, the user profile information can contain an instruction that commands the MSC 24 to delete from its database the registration entry for the particular cellular communications device after the expiration of a certain time period. This allows the MSC 24 to clear from its database entries for cellular communications devices 34 that have communicated data messages via the MSC 24 because such devices no longer require the continued communications support of the MSC 24. For example, these devices do not require continued support for conventional voice communications because they do not require assignment of a voice channel.

The data collection system 40 can store the selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step is necessary prior to communication with the data processing system 46 because, unlike the MSC 24 and the data collection system 40, neither the data processing system 46 nor the second communications link 48 are compatible with the IS-41 standard.

Although for the preferred embodiment the MSC 24 is programmed to treat the cellular communications devices 34 as roamers associated with a foreign cellular system, it will be appreciated that the database of the MSC 24 also can be programmed to contain entries for the predetermined identifying characteristics of those cellular communications devices 34 operating within the cells of the cellular system 8. Upon receiving a data message via the control channel 38 from such a device 34, an MSC 24 containing such database entries will identify the transmitting cellular communications device 34 as a "home" unit rather than as a roamer because the MSC database contains an entry that corresponds to the predetermined identifying characteristic supplied by the message. Thus, the MSC 24 registers the transmitting cellular communications device 34 as a home unit of the cellular system 8. This avoids the additional requirement of contacting a foreign cellular system, such as the data collection system 40, to inquire whether this cellular source is a valid user or subscriber of cellular services.

However, to initiate the necessary transfer of the information in the data message to the data collection system 40, the MSC 24 for this embodiment is adapted to recognize that data messages should still be forwarded to the data collection system 40. Specifically, based upon a portion of the predetermined identifying characteristic that is uniquely associated with the data collection system 40, the MSC 24 locates an entry in its database that commands the switch to send all messages containing such a characteristic to the data collection system 40. Accordingly, the MSC 24 thereafter forwards the data message via the first communications link 42 to the data collection system 40.

The data collection system 40 can be implemented by a computer. One embodiment for the data collection system 40 is the computer of a service circuit node. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is preferably implemented as an AMPS or a DAMPS cellular system. However, it will be appreciated that the cellular system 8 also can be compatible with alternative cellular systems implementing a control channel for mobile to cell communications, including: DCS 1800, IS 95-CDMA, JTACS, TACS, ETACS, RC 2000, NMT 450, ESMR, WACS, NMT 900, or other similar wireless systems.

It will be appreciated that the CMR system 8 includes an array of cells, such as the cell 12, and that a set of reporting systems 29, each formed by the monitor 32 and the cellular communications device 34, are typically located in a cell. For each data source 30 within the cell 12, the monitor 32 and the cellular communication device 34 are preferably located proximate to the data source 30 to minimize the lengths of the signal paths 31 and 33. To facilitate economical installation of the reporting device, the monitor 32 and the cellular communication device 34 can be combined within the same housing and this housing can be installed either adjacent to or as an integral part of the data source 30. For an installation proximate to the data source 30, the signal path 31 and the signal path 33 preferably form hard-wired connections between the connected devices. Nevertheless, it will be appreciated that the signal paths 31 and 33 also can be implemented as either infrared communications links or wireless communications links.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30.

The data collection system 40 can be located proximate to or as an integral part of the MSC 24, in which case the first communication link 42 preferably forms a hard-wired connection between the devices. However, the data collection system 40 also can be positioned at a remote site. For this remote installation, the first communications link 42 can be implemented as a wireless communications system, such as a microwave system, or as a dedicated data line, such as a conventional telephone facility. For the convenience of the party that is sponsoring the collection of a particular type of data, the data processing system 46 is typically located at another remote site that is typically proximate to the sponsoring party.

FIG. 2 is a table that shows the format for the data message that is communicated by the data message system 10. Referring now to FIGS. 1 and 2, a data record 50 for the data message contains both a data field 54 for the selected data acquired from the remote data source 30 and a data field 52 for a predetermined identifying characteristic which uniquely identifies the cellular communications device 34 that initiates the transmission of the data message. The data fields can be separated by one or more selected characters to distinguish the data fields. To take advantage of the existing architecture of a CMR system 8, the format for the data message preferably is identical to the message format (or data record) for a conventional call origination signal that is transmitted by a cellular radiotelephone when it originates a cellular call for communication via a CMR system, such as the CMR system 8.

By using the data message format associated with a call origination message, the cellular communications device 34 can mimic the initiation of a cellular telephone call by sending a data message that appears to contain a valid mobile telephone number and an ESN. Although it is not intended for the cellular communications device 34 to place a conventional voiced-based cellular telephone call, the cellular communications device 34 imitates a conventional cellular radiotelephone device by generating the call origination-formatted signal, thereby enabling a data communication of selected data to the MSC 24.

As shown in the data record 50 in FIG. 2, the message format for a conventional call origination signal has been adapted by the data message to permit the identification of the particular transmitting cellular communications device 34 and the communication of the selected data. In particular, the data field 52 for the predetermined identifying characteristic corresponds to at least a portion of a mobile telephone number or MIN assigned to the cellular communications device 34. Thus, the predetermined identifying characteristic is substituted within the data field normally reserved for the MIN in the call origination signal. This predetermined identifying characteristic can belong to a set of unassigned mobile telephone numbers. Alternatively, the predetermined identifying characteristic assigned to each cellular communications device 34 can be a conventional telephone number or a set of 10 digits. The predetermined identifying characteristic permits the identification of the source of the data by uniquely identifying the cellular communications device 34 associated with the remote data source 30. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record of a call origination signal for the ESN. Those skilled in the art will appreciate that the ESN is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. For most applications, it will not be necessary to manipulate the manufacturer's code segment of the ESN because a data message having 24 bits of selected data (and, as required, 8 bits of the manufacturer code segment for a conventional ESN) should be sufficient to supply relevant data. As an option, a Called Address Field (not shown), which normally contains the digits for the called party's telephone number, can be used for the placement of selected data within the data message.

Although adapting certain predefined data fields of a conventional call origination signal is the preferred method for forwarding selected data in a data message to the MSC 24, the message protocol for a registration signal associated with the Autonomous Registration function also can be used to send desired information from the cellular communications device 34 to the MSC 34 via the control channel 38. The call origination signal is substantially similar to the signal for the Autonomous Registration function, with the exception that the call origination signal includes the Called Address Field and a flag to distinguish it from the Autonomous Registration function. This flag permits the CMR system to determine whether a call origination function or a registration function should be conducted in response to a reception of these signals.

Figure 3:
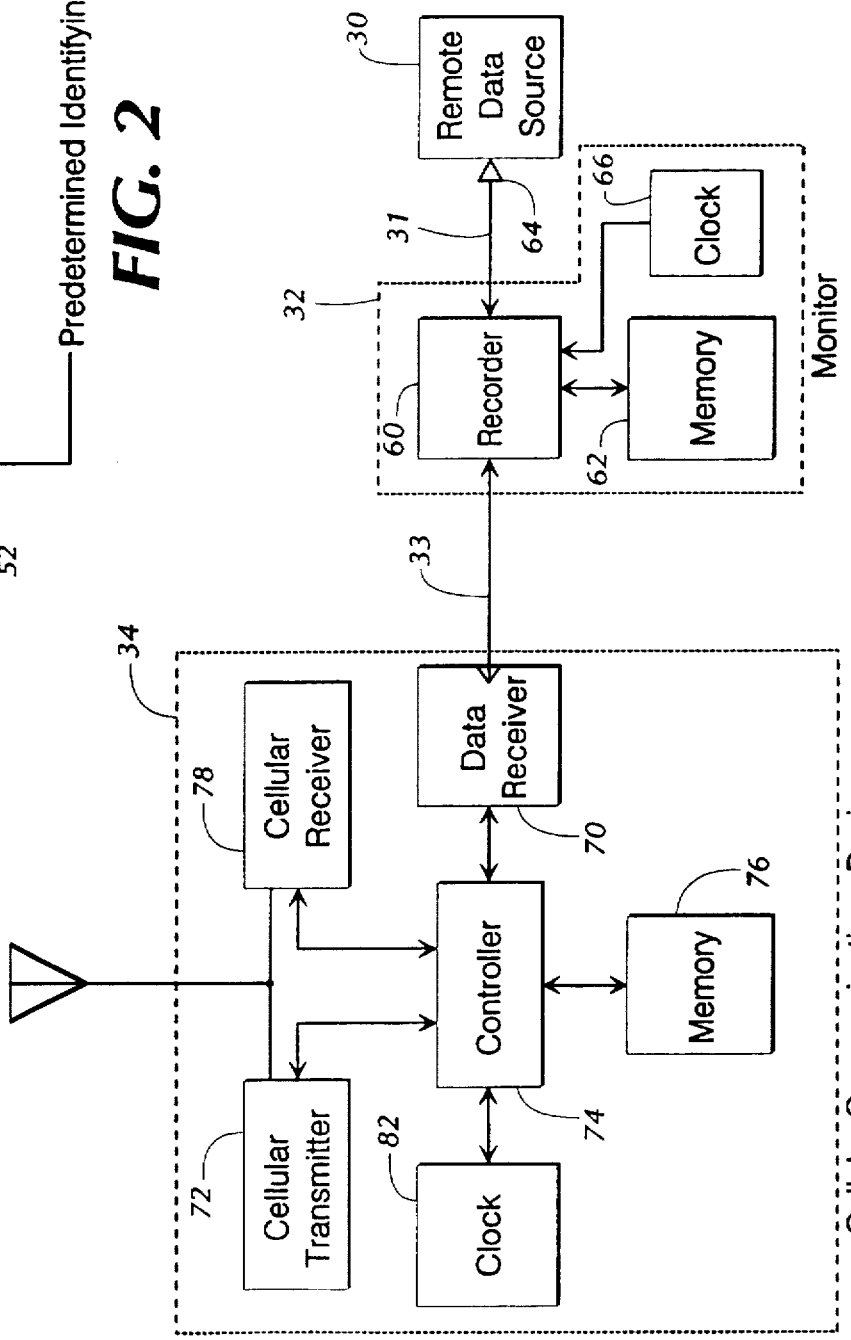
FIG. 3 is a block diagram of a data reporting system for the preferred embodiment of the data message system.

FIG. 3 is a block diagram that illustrates the components of the reporting system 29, namely the monitor 32 and the cellular communications device 34. Referring now to FIGS. 1 and 3, the monitor 32 includes a recorder 60, a memory 62, and one or more sensors 64. The recorder 60, which is connected to the data source 30 via the signal path 31, uses the sensors 64 to detect certain operating or performance characteristics of the data source 30. The detected characteristics represent selected data that are preferably stored within the memory storage device 62. The memory 62 is preferably random access memory (RAM). However, it will be understood that the memory 62 also can be implemented by other types of mass data storage devices, including a computer hard disk drive, an optical disk drive, or a compact disk (CD-ROM).

It will be appreciated that the signal path 31 represents one or more signal channels for transferring the selected data to the recorder 60 and, furthermore, that the recorder 60 can be implemented as either a single or multi-channel recording device. Each signal channel normally would be associated with a different operating or performance characteristic for the data source 30.

For certain applications, the recorder 60 records selected data from the data source 30 for a predetermined time period. A clock 66 connected to the recorder 60 supplies timing data to the recorder 60, thereby enabling the recorder 60 to add a time tag to the selected data. The time tag indicates the relative time for the start of each predetermined time period of recording operations. Assuming that the predetermined time period is a known value, the addition of the time tag data permits the calculation of the start and completion times for each data reporting operation. Correlation of the data collection time to the selected data is desirable for certain processing operations. The clock 66 can be implemented as a conventional counter supplied by a hardware device or as a software routine executed by a microprocessor.

The cellular communications device 34 can include at least a data receiver 70, a cellular transmitter 72, and a controller 74. The data receiver 70, which is connected to the recorder 60 via the signal path 33, receives the selected data obtained from the data source 30 by the monitor 32. The controller 74, which is connected to the data receiver 70 and the cellular transmitter 72, controls the respective operations of the data receiver 70 and the cellular transmitter 72. The controller 74 is preferably a microprocessor-based control system that can be programmed to conduct control operations in a manner known to the art.

In response to the selected data, the controller 74 prepares a data packet containing the predetermined identifying characteristic associated with the cellular transmitter 72 and the selected data collected from the data source 30. The cellular transmitter 72 responds to the data packet by transmitting a corresponding data message via the control channel 38 of the CMR system 8. Specifically, the cellular transmitter 72 uses the RECC of the control channel 38 to send data messages to the MSC 24. Although the cellular transmitter 72 can be implemented as a conventional transmitter for a radiotelephone unit, the preferred cellular transmitter 72 uses only the data radio channels of the CMR system 8 for transmission of data messages. Consequently, the cellular transmitter 72 is preferably implemented as a data transmitter capable for transmitting data messages, formatted as a call origination signal, via the RECC of the control channel 38.

The cellular communications device 34 further includes a memory storage device 76 connected via a bi-directional data path to the controller 74. The selected data received by the data receiver 70 can be stored in the memory storage device 76 prior to the transmission of a data message by the cellular transmitter 72. Although the memory storage device 76 is shown as a separate memory from the memory storage device 62, it will be appreciated that the memory storage devices 62 and 76 can be implemented as a single memory which is accessible by both the recorder 60 and the controller 74.

To receive communications from the MSC 24 via the control channel 38, the cellular communications device 34 also includes a cellular receiver 78. The cellular receiver 78, which is connected to the controller 74, can be implemented as the cellular receiver for a conventional radiotelephone. However, similar to the cellular transmitter 72, the preferred cellular receiver 78 operates to receive information primarily via the data radio channels rather than the voice radio channels of the CMR system. Indeed, the preferred embodiment uses a cellular receiver 78 having only data communications capability to avoid the expense and weight of additional circuitry for voice-based communications.

It is well known that the FOCC of the cellular network control channel carries a stream of busy idle bits to indicate the status of the RECC of the cellular network control channel. The RECC is busy if the busy idle bit is set to a binary one value. To minimize the impact of transmissions by one or more cellular communications devices 34 within the cell 12 upon the normal control signal traffic on the control channel 38, the cellular transmitter 72 preferably transmits the data message during those periods when the channel is available or is likely to be available. Accordingly, the cellular receiver 78 monitors the FOCC of the control channel 38 to enable a determination of the amount of activity on the RECC for the monitored cell. By monitoring the FOCC and counting the number of busy idle bits set to the binary one value for a predetermined time period, the cellular communications device 34 can determine the level of control channel activity during that time period. If the level of control channel activity falls below a certain threshold associated with light or no activity on the control channel, then the controller 74 supplies the data packet to the cellular transmitter 72. In response, the cellular transmitter 72 initiates a data message transmission, formatted to appear as a call origination signal, to the MSC 24 via the RECC of the control channel 38.

In particular, the cellular communications device 34 preferably monitors the busy idle bits carried by the FOCC of the control channel 38 for sequential, predetermined time periods. The cellular communications device 34 calculates and stores (1) a running average of the "highest" count of busy idle bits set to the binary one value per each monitoring time period, and (2) a last "n" count of busy idle bits set to the binary one value per monitoring time period. To calculate the running average, a newly acquired count of busy idle bits set to the binary one value per time period is averaged with a stored average of busy idle bits set to the binary one value if the count for the immediately preceding interval is higher than a value of one standard deviation lower than the stored average. Prior to transmitting a data message via the control channel 38, the cellular communications device 34 will average the stored last "n" counts of busy idle bits set to the binary one value per time period and compare that computed "n" average to the stored running average. If the computed "n" average drops below the stored running average, then the cellular communications device 34 outputs the data message. However, if the computed "n" average exceeds the stored running average, then the cellular communications device 34 will delay the transmission. In contrast to conventional radiotelephone units, which are responsive to an instantaneous view of activity on the control channel, it will be appreciated that the above-described transmission queuing process is a heuristic method based upon a deterministic analysis of the stream of busy idle bits.

In this manner, the cellular transmitter 78 delays transmitting the data message to a time interval when the control channel is available for clear use by the cellular communications device 34. This form of data queuing minimizes the possibility that the operation of numerous cellular communications devices 34 within the cell 12 will interfere with normal telephone conversations involving the operating radiotelephones within the cell. Nevertheless, it will be appreciated that the cellular transmitter 78 also can transmit the data message without first checking the availability of the control channel 38.

Alternatively, the cellular communications device 34 can be programmed to transmit the data message during a certain time interval, such as during the early morning hours between midnight and 6 AM, when control signal traffic is normally at a minimal level. To permit this type of automated transmission operation, the cellular communications device 34 includes a clock 82 connected to the controller 74. The clock 82 outputs a clock signal in response to expiration of a time interval. In response to the clock signal, the controller 74 initiates a data message transmission by the cellular transmitter 72. In this manner, selected data is transmitted during a known time interval from one of the reporting devices within the cell 12 to a central location.

The clock 82 preferably outputs the clock signal during the time period when use of the control channel 38 is at a reduced level, thereby minimizing the possibility that the cellular communications device 34 will interfere with the normal communications operations of the CMR system 8. In particular, the time interval is preferably selected with advance knowledge of the reduced activity periods for conventional telephone conversation traffic on the CMR system 8 to ensure that data message transmissions by the various cellular communications devices 34 in the cell 12 are conducted on a noninterference basis with voice call processing messages transmitted to and from the radiotelephones operating in the cell. The clock 82 can be implemented as either a hardware counter or as a software counter implemented by coded instructions executed by the controller 74.

A data transmission by the cellular communications device 34 also can be initiated in response to a status signal output via the signal path 33 by the monitor 32. This status signal causes the cellular communications device 34 to transmit the stored selected data via the RECC of the control channel 38. The monitor 32 typically outputs the status signal in response to the completion of a data recording event. For example, in a typical vending equipment application, the monitor 32 can output the status signal in response to an alarm event, such as the detection of a maintenance service requirement. Alternatively, for an utility load management application, the monitor 32 can output the status signal in response to detection of possible tampering of the utility's load control device. Those skilled in the art will appreciate that the generation of the status signal is event-driven and that the applications for the data message system 10 will determine those events.

For the described embodiment, the cellular communications device 34 responds to the clock signal or the status signal by sending a data message having a message format of a conventional call origination signal. In turn, the MSC 24 receives the data message via the control channel 38 and subsequently operates upon the data message as if it were a call origination signal transmitted by a conventional cellular radiotelephone unit.

Although the time interval for the clock 82 is preferably selected to minimize any interference from data message transmissions, it is still possible that the cellular network control channel 38 may be busy when the clock 82 outputs the clock signal to initiate a transmission by the cellular transmitter 72. To minimize this possible interference problem, the data message transmission is delayed until the cellular communications device 34 detects a level of activity on the control channel 38 that is less than a certain threshold for a predetermined time period. Although this delays a data message transmission that normally would have taken place in direct response to the clock signal, the delay allows the cellular communications device 34 to transmit the data message during an interval when the control channel 38 is not busy.

For this embodiment, the controller 74 responds to the clock signal output by the clock 82 by detecting the busy idle bits set to a binary one value, as carried by the FOCC and received via the cellular receiver 78, and calculating both the running average and the "n" average. This running average is stored within the memory storage device 76. The controller 74 will supply a data packet containing the selected data to the cellular transmitter 72 only when the computed "n" average drops below the stored running average. It will be appreciated that this process of queuing the transmission of data messages typically requires the storage of the selected data within the memory 76 prior to initiating the data message transmissions.

It is well recognized that a cellular network control channel, such as the control channel 38, is a two-way communications path between the MSC 24 and the radiotelephone devices operating in the cell 12. Thus, the receiver 78 is also useful for receiving communications from the MSC 24 via the FOCC of the control channel 38. In particular, the MSC 24 can output command signals via the control channel 38 to initiate certain operations or to control certain functions of one or more of the cellular communication devices 34 within the cell 12. The cellular communications device 34 is preferably programmed to respond to a command signal by conducting a particular operation or by controlling a certain function associated with the command signal.

The command signals typically include address data and each cellular communications device 34 only responds to a command signal containing its predetermined address data. This allows the MSC 24 to communicate with one or more of certain selected communications devices 34. By proper use of the addressing operation, it is possible for the MSC 24 to remotely control the operations or functions of a subset of the cellular communications devices 34 that is selected from the overall group of devices 34 within the cell 12.

The address data of the command signal is preferably a 10 digit number that represents a conventional telephone number. At least a portion of this telephone number is assigned to a corresponding cellular communications device 34. The remaining portion (if available for use) of the 10-digit telephone number can represent a command for a particular operation or function. In this manner, a cellular communications device 34 can be programmed to respond only to a command signal containing its address data and to conduct the particular operation or function identified by the address data.

By transmitting command signals to the cellular communications devices 34, the MSC 24 can remotely control various operations of the cellular communications devices 34 or can remotely define various programmable operating parameters of the devices 34. In response to a selected command signal, the cellular communications device 34 mimics the call origination operation of a conventional cellular radiotelephone unit by transmitting a data message formatted as a call origination signal to the MSC 24. By use of this command signal, a selected cellular communications device 34 can be polled at any time by the MSC 24 to initiate the transmission of a data message containing the desired selected data.

In response to another command signal, the time interval for the clock 82 is modified or otherwise replaced with a substitute time period. The cellular communications device 34 also can instruct the monitor 32 to initiate a recording of data from the remote data source 30 in response to yet another command signal. In particular, the controller 74 responds to the detection of the command signal by the cellular receiver 78 and outputs an instruction signal to the recorder 60 to prompt the data reporting operation.

Figure 4:
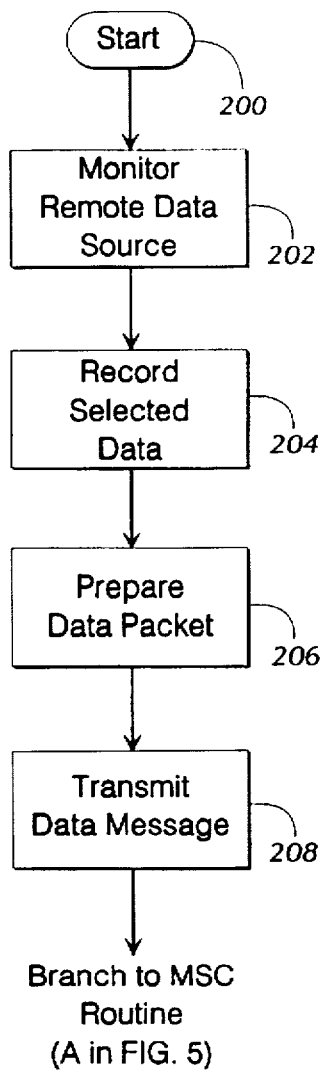
FIG. 4 is a flow chart diagram that shows the steps for a method of communicating a data message via the preferred embodiment of the data message system.

FIG. 4 shows the preferred steps of a method for communicating data collected from remote data sources via a cellular network control channel of a CMR system. With the foregoing general operation of the components of the data collection system 10 in mind, and referring now to FIGS. 1 and 4, the method starts at the start block 200. At step 202, the operation of one or more remote data sources 30 is monitored, typically for a predetermined time period. At the step 204, selected data directed to the operation or performance characteristics of the remote data source 30 are collected and stored. A data packet containing the selected data and the predetermined identifying characteristic is prepared in the step 206. At step 208, the data message corresponding to the data packet is transmitted to the MSC 24 via the control channel 38 of the CMR system 8. The above-described steps are preferably implemented by one or more software routines that are executed by the reporting system 29 formed by the monitor 32 and the cellular communications device 34.

Figure 5:
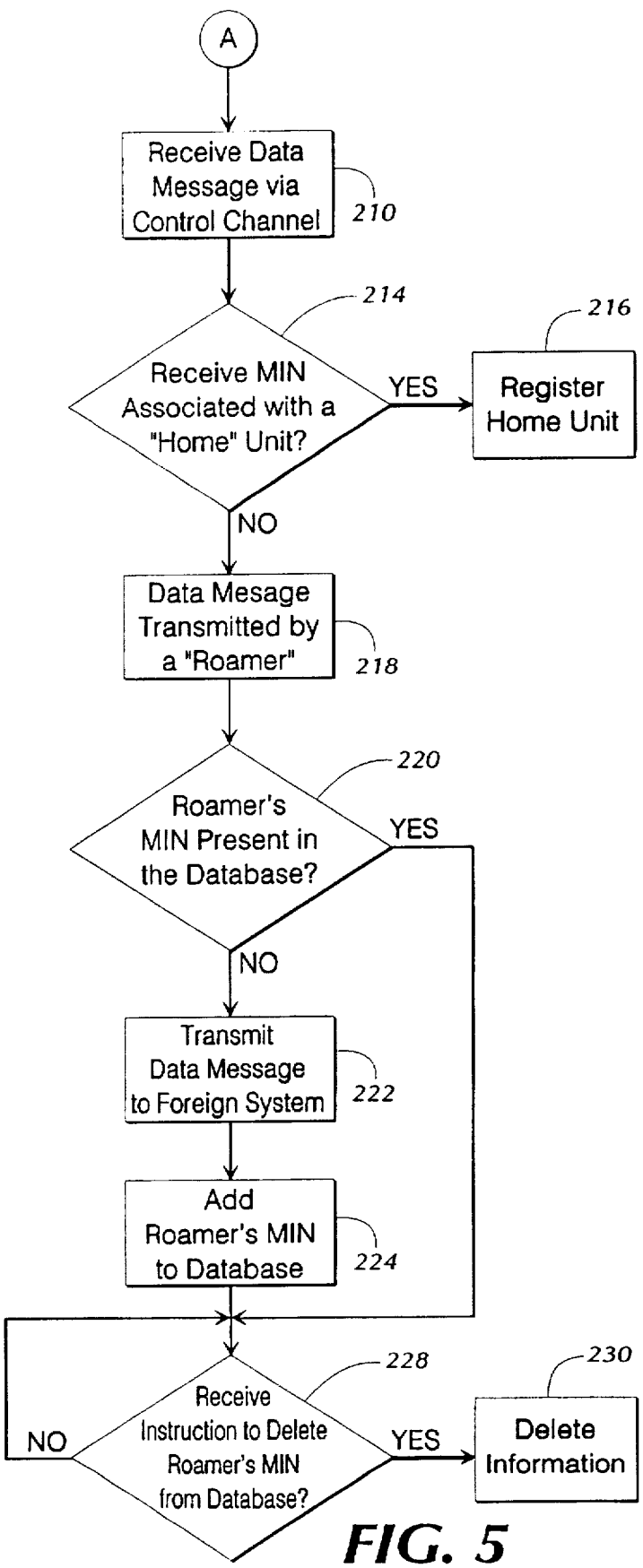
FIG. 5 is a flow chart diagram that shows the steps for a method of processing a data message by the preferred embodiment of the data message system.

The program next branches to block A (FIG. 5). During the enablement of this program branch, the MSC 24 determines whether a cellular call origination signal has been transmitted by a roamer or by a home unit based upon the information contained in the data message which, in this case, is formatted as a call origination message. Consequently, the data message contains information placed in at least the data fields corresponding to a MIN and ESN in a conventional call origination signal. As an option, selected data can also be placed in the data field normally reserved for the telephone number of the called party, i.e., the Called Address field.

FIG. 5 illustrates the preferred steps taken by the MSC 24 to determine whether the received data message has been transmitted by a roamer or by a home unit and the resulting actions taken by the MSC 24 based upon this initial determination. Turning now to FIGS. 1 and 5, the database operations conducted by the MSC 24 begin at step 210 of branch A. At step 210, a data message, preferably formatted as a call origination signal for initiating a cellular communication, is received via the control channel 38 at the MSC 24, and the data fields of the data message are examined. At decision block 214, if the data in the received MIN field represents a MIN associated with a home unit having an entry in the database of the MSC 24, then the "YES" branch is followed to block 216. In block 216, the home unit, which is a conventional cellular radiotelephone unit associated with a subscriber of the services offered by the CMR system for this MSC, is considered to be a valid user for cellular voice-based communications via with the MSC 24. It is highly likely that at least some of the conventional radiotelephones operating within the cell 12 represent subscribers to the cellular services offered by the CMR system 8 and, accordingly, those radiotelephones are typically identified as home units. In contrast, the transmissions by the cellular communications devices 34 operating within the cell 12 are preferably designed to appear as transmissions from roamers associated with a foreign or remote CMR system, such as the data collection system 40.

If the data in the received MIN field does not match an entry in the database maintained by the MSC 24, then the "NO" branch is followed to step 218, where the MSC 24 determines that the source of the data message signal is a roamer. The MSC 24 makes this determination based on information within the data message in a data field corresponding to the MIN. For the data message originated by a cellular communications device 34, the predetermined identifying characteristic is stored in the data field normally reserved for the MIN. At least a portion of the predetermined identifying characteristic identifies the data collection system 40 as the "home" service provider for the cellular communications device 34. Thus, the MSC 24 determines that the data message has been transmitted by a roamer associated with a another CMR system, such as the data collection system 40.

At decision block 220, the database maintained by the MSC 24 is checked to determine whether the information associated with the MIN field is present. As explained in more detail below, the MSC 24 normally will not locate the predetermined identifying characteristic within this database because the data message has been transmitted by a cellular communications device 34, rather than by a conventional radiotelephone unit. If this inquiry is negative, the "NO" branch is followed to block 222.

At block 222, the MSC 24 forwards certain identification information to the CMR system associated with the roamer, as identified by information obtained from the MIN data field. This CMR system is typically represented by a home location register. For example, the MSC 24 can transmit information taken from certain fields of the received data message, including the predetermined identifying characteristic and the selected data, via the first communications link 42 to the data collection system 40. At this point, the data collection system 40 recognizes that the transmitted information contains the desired selected data, and typically stores the selected data within the memory storage device 44 to facilitate subsequent uses of the selected data. In addition, the data collection system can issue a validation message to the MSC 24 via the first communications link 42. The validation message confirms that the source of the information provided by the data message is a valid user of services offered by this foreign CMR system, i.e., the data collection system 40. This validation message also preferably indicates that the MSC 24 should deny cellular voice communications privileges for this source because no voice-based call is actually associated with the data message transmitted by the responsible cellular communications device 34. This type of validation message prevents the MSC 24 from attempting to assign a cellular voice channel for use by the source of the data message.

If the information of the MIN field is contained in the database of the MSC 24, then the steps 222 and 224 are jumped by following the "YES" branch to decision block 228.

Information concerning a roamer, such as a cellular communications device 34, can be added, at least temporarily, to the database at the MSC 24 during the step 224 in response to the validation message. However, at step 228, an inquiry is conducted to determine if the MSC 24 has received an instruction from the CMR system associated with the roamer, such as the data collection system 40 which requests the deletion of the roamer information from the MSC database. If the response is positive, the "YES" branch is followed to step 230 and the MSC 24 deletes the entry from the database. In this manner, the database is not cluttered with information that is no longer relevant to the operations of the MSC 24. In contrast, if the response is negative, then the "NO" branch is followed back to the step 228.

The steps shown is FIG. 5 are preferably implemented by one or more computer software routines that reside on and are executed by the MSC 24. The software development techniques necessary to code this process and to create the necessary software routines are known by those skilled in the art.

Figure 6:
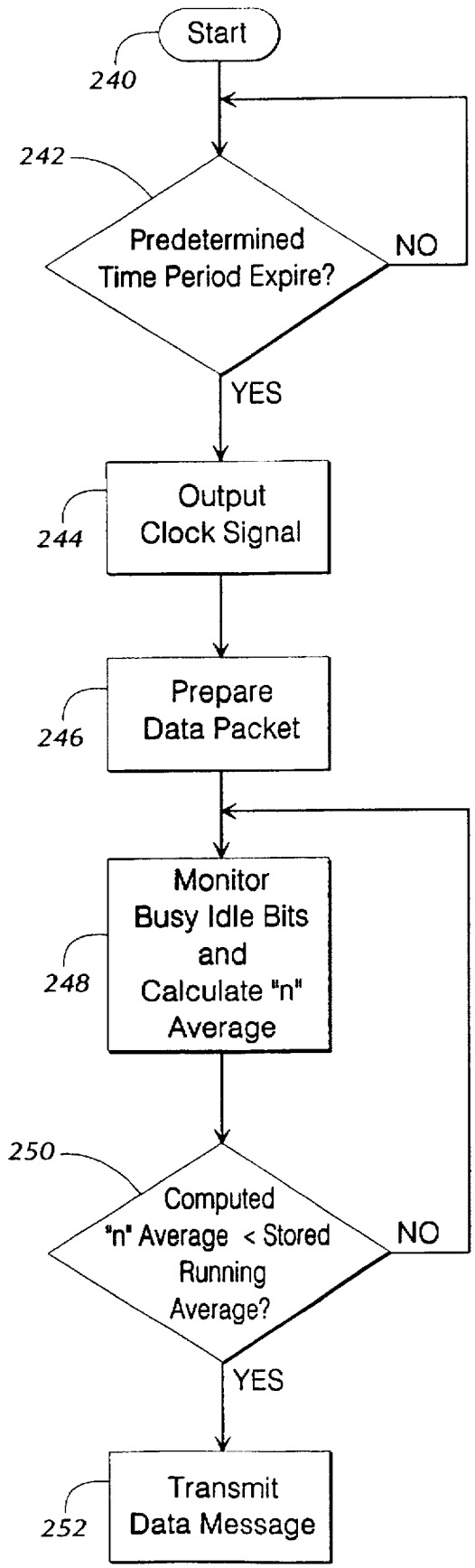
FIG. 6 is a flow chart diagram that shows the steps for a method for initiating the transmission of a data message via a cellular communications device of the preferred embodiment of the data message system.

FIG. 6 is a flow chart diagram that shows the steps for a method for initiating the transmission of a data message via a cellular network control channel of a cellular system. Referring to FIGS. 1 and 6, the method is started at the start block 240. At step 242, an inquiry is made whether a certain time interval has expired. If the time period has not expired, the "NO" branch is followed to the start block 240. In contrast, if the time period has expired, then the "YES" branch is followed to the block 244. In step 244, a clock signal is output upon the expiration of the certain time interval. A data packet is prepared in step 246 to permit the transmission of a data message containing the predetermined identifying characteristic and the selected data. At this point, the cellular communications device 34 is ready to transmit the data message if a data channel of the cellular network control channel is available on a noninterference basis.

In step 248, the cellular communications device 34 monitors the stream of busy idle bits carried by the FOCC of the control channel 38 and thereafter calculates the average for the last "n" busy idle bits having a binary one value per time interval. At decision block 250, an inquiry is conducted to determine whether the computed "n" average is less than the stored running average of the highest count of busy idle bits having a binary one value per time interval. If the response to this inquiry is negative, the control channel 38 is busy and, accordingly, transmission of the data message is delayed by following the "NO" branch to the step 248 and the sequence of monitoring the busy idle bits and calculating averages continues. In contrast, if the response is positive, then the "YES" branch is followed to step 252 and the data message is transmitted via the RECC of the control channel 38 to the MSC 24.

The steps shown is FIG. 6 are preferably implemented by one or more computer software routines that reside on and are executed by the cellular communications device 34. The software development techniques necessary to code this process and to create the necessary software routines are known by those skilled in the art.

Paging Acknowledgment System

Figure 7:
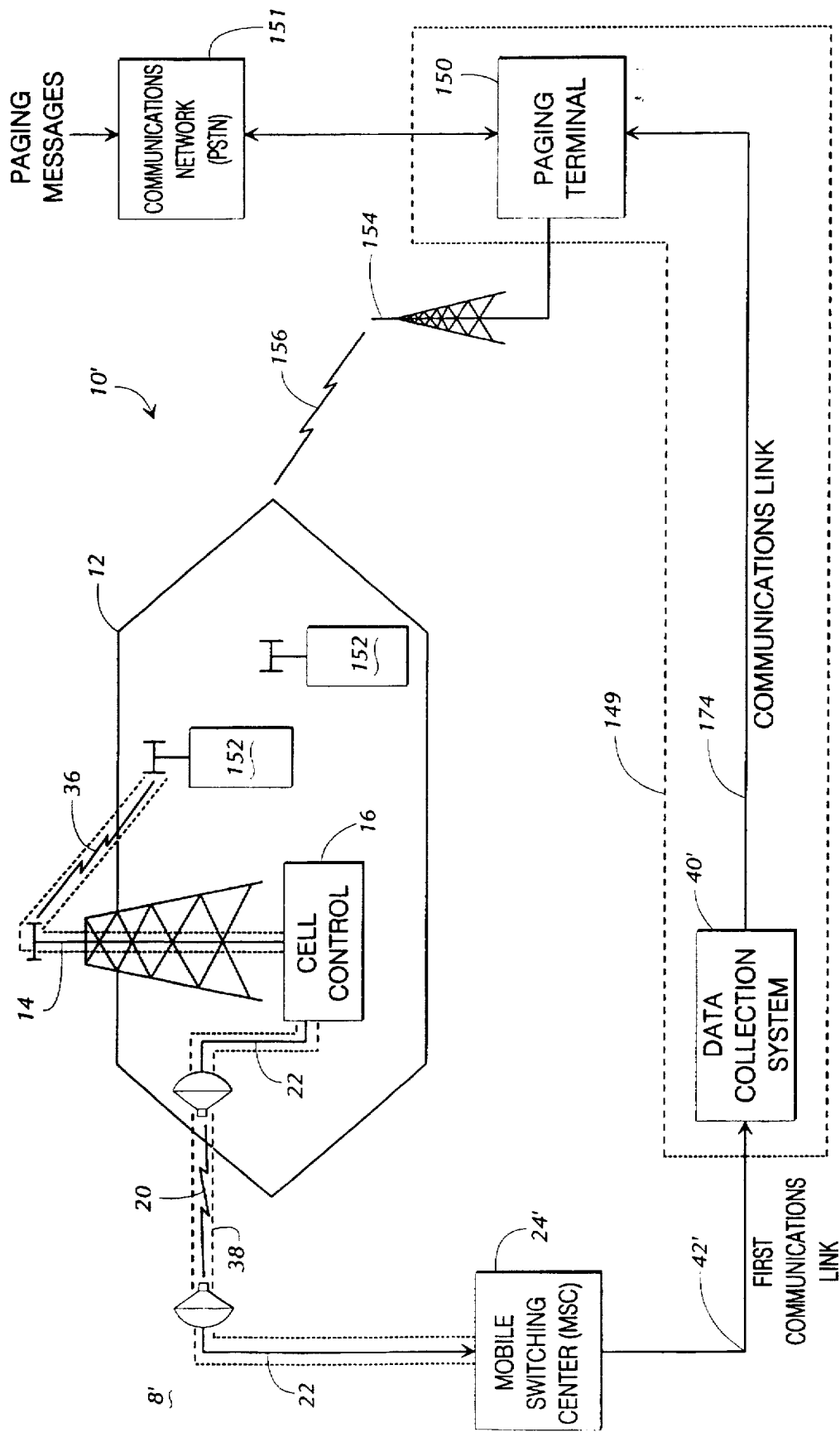
FIG. 7 is a block diagram of the preferred embodiment of a paging acknowledgment system within its operating environment of a CMR system.

Referring now to FIG. 7, which illustrates another embodiment of the present invention, a paging acknowledgment system 10' operates within the environment of a CMR system 8' for communicating acknowledgment messages in response to reception of paging messages. This allows a paging party that uses the communications services offered by the system 10' to receive some form of an acknowledgment that a paged party has actually received the paging message.

Similar to the data collection system 10, the paging acknowledgment system 10' takes advantage of the installed equipment offered by a conventional CMR system, such as the CMR system 8, to supply either a local area or wide area communications system for communicating acknowledgment messages. Because the acknowledgment messages contain data-based information rather than voice-based information, the system 10' uses only the cellular network control channel of a CMR system for communicating the acknowledgment messages. By avoiding any use of the valuable voice channels of a CMR system, the system 10' conserves the use of the voice channels for conventional telephone conversations by users of cellular radiotelephones. Accordingly, the system 10' permits the expanded use of available resources offered by existing or adapted equipment for a CMR system, while minimizing any interference to conventional voice-based applications, namely telephone conversations.

As shown in FIG. 7, the paging acknowledgment system includes a communications system 149 comprising at least one paging terminal 150 and a data collection system 40', one or more remote communications devices 152, and at least one MSC 24' associated with the CMR system 8'. In general, the communications system 149 responds to a paging message from a paging party by preparing a data message that corresponds to the paging message. A particular acknowledgment code, which is assigned by the communications system 149 to the data message, is stored to support a subsequent determination of whether the data message has been properly acknowledged by one of the remote communications devices 152. The communications system 149 thereafter transmits the data message via a communications path 156 to a selected remote communications device 152.

A selected remote communications unit 152 receives the data message and thereafter prepares an acknowledgment message containing the acknowledgment code taken from the data message. The selected remote communications device 152 then transmits the acknowledgment message to the MSC 24' via the cellular network control channel 38. The MSC 24' recognizes that the source of the acknowledgment message is associated with the communications system 149 and forwards the acknowledgment message to the communications system 149 via a first communications link 42'. The communications system 149 processes the acknowledgment message and determines whether the acknowledgment message corresponds to a particular one of the data messages. This determination is made by comparing the acknowledgment code in the acknowledgment message to the stored acknowledgment codes associated with data messages. If a match is made, then the acknowledgment can be stored for later use or supplied to the paging party.

Referring still to FIG. 7 and reviewing in more detail the operation of the paging acknowledgment system 10', a party desiring to contact another party at a remote site forwards a paging message via a communications network 151 for eventual transmission by the paging terminal 150. In response to the paging message, the paging terminal 150 transmits a data message, which corresponds to the paging message, via an antenna 154. The combination of the paging terminal 150 and the antenna 154 preferably operates as a conventional radiopaging system having the capability of broadcasting data messages over a known geographical area. A remote communications device 152, operating within the geographical coverage area, is responsive to a data message containing its particular address. Specifically, the remote communications device 152 transmits an acknowledgment message via a cellular network of the CMR system 8', namely the control channel 38' and the MSC 24'. As described below, the reception of the acknowledgment message by the MSC 24' enables the process for verifying the reception of the data message.

For the preferred embodiment, the paging terminal 150 receives a paging message via the communications network 151, such as the preferred public switched telephone network (PSTN). It will be appreciated that the communications network 151 can be implemented as other known communications systems, including a data network, such as a value added network (VAN) (not shown), or a dedicated data line (not shown). The paging terminal 150 is adapted to handle the special requirements for an acknowledgment system and responds to the paging message by preparing a corresponding data message. The data message includes the following information: (1) an address that uniquely identifies the intended receiving device, specifically a selected remote communication device 152, (2) an acknowledgment code that uniquely identifies the particular data message and the corresponding paging message, and (3) paging data associated with the paging message. The format of the data message will be described in more detail below with respect to FIG. 8.

The paging party typically supplies the information associated with the address for the selected remote communications device 152 and the paging data for communication to the user of the selected device 152. In contrast, the paging terminal 150 is adapted to supply the acknowledgment code for use with the data message and preferably stores or archives the acknowledgment code to permit later comparisons to an acknowledgment code returned in acknowledgment messages from the remote communications devices 152, as described below. Each data message is assigned a unique acknowledgment code to support the comparison of data messages to a particular acknowledgment message. The paging terminal 150 thereafter can transmit the data message via a radiopaging network to complete the communication of the paging message to the intended paged party.

For local area communication of a paging message, the paging terminal 150 transmits the corresponding data message for direct reception by a selected remote communications device 152 that is known to normally operate within the geographic coverage area of the paging terminal 150. However, if the remote communications device 152 normally operates outside of the geographical coverage area of the paging terminal 150, then the terminal 150 forwards the data message to another paging terminal via a national paging network (not shown) for transmission of the data message within the appropriate geographical area. This use of a group of paging terminals connected by a radiopaging communications network to form a wide area communications network is well known within the paging industry. The following description of the operation of the system 10' is based upon local distribution of the data message to the remote communications device 152.

The paging terminal 150 communicates with the remote communications devices 152 operating within its geographical coverage area via a radiopaging communications path 156, which is preferably implemented as a wireless communications system, such as a microwave or radio frequency (RF) radio link. However, it will be understood that the radiopaging communications path 156 also can be implemented by a wired communications system, including a dedicated data line or a conventional telephone facility. For the preferred communications path 156, the paging terminal 150 transmits the data message via the antenna 154.

A remote communications device 152 responds to a data message containing its particular address by supplying the paging data associated with the paging message to the user of the device 152. In a manner similar to a conventional pager, the preferred remote communications device 152 outputs an alert to the user to indicate the reception of a data message and thereafter presents in a conventional manner the paging data to the user. As is well known in the paging system industry, the alert can be a visual, audible, or tactile signal and the presentation of the paging data can be conducted in an audible or textual (or graphical) format.

The remote communications device 152 further responds to the data message by sending via the CMR system 8' an acknowledgment message that includes the acknowledgment code of the data message. It will appreciated that the acknowledgment code permits a subsequent correlation between the outgoing data message (and corresponding paging message) and the incoming acknowledgment message. As described in more detail with respect to FIG. 9, the acknowledgment message contains information in a datatype format to permit communication of this information via the control channel 38'. In particular, to take advantage of the known architecture of a CMR system, the acknowledgment message is formatted to appear as a conventional call origination signal that is transmitted by a cellular radiotelephone unit for completing a Call Origination function, i.e., when the cellular unit originates a cellular telephone call for communication via the CMR system.

The remote communications device 152 sends the acknowledgment message to the cell control 16 in the cell 12 via a cellular communications link 36. In turn, the cell control 16 forwards the acknowledgment message to the MSC 24' via the data link 22. The control channel 38, which is formed by the data link 22 and the cellular communications link 36, permits the communication of control signals between each remote communications device 152 within the cell 12 and the MSC 24'.

The MSC 24' receives the acknowledgment message via the control channel 38 and, based upon certain information supplied in the acknowledgment message, determines that the message appears to have been transmitted by a roaming radiotelephone unit. Without any recognition that the acknowledgment message was actually transmitted by an adapted cellular device, such as a remote communications device 152, the MSC 24' treats the acknowledgment message as if the message had been transmitted by a "roamer"-type cellular device. Accordingly, the MSC 24' forwards via a first communications link 42' the acknowledgment message to another cellular system associated with this roamer, a data collection system 40'. In turn, the data collection system 40' recognizes that the acknowledgment message contains an acknowledgment code and sends the code via the communications link 174 to the paging terminal 150 for comparison with the stored acknowledgment codes assigned to the outgoing data messages. A successful match confirms the reception of a data message corresponding to a particular paging message.

Figure 8:
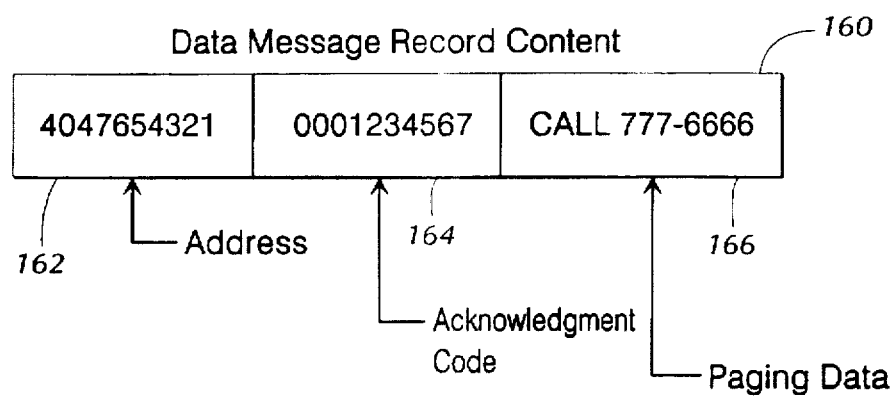
FIG. 8 is a table showing the format for a data message that is communicated via the preferred embodiment of the paging acknowledgment system.

Prior to reviewing further details for the operation of the paging acknowledgment system 10', it will be useful to review the data structures for the data message and the acknowledgment message. FIG. 8 is a table that shows the format for a data message that is transmitted by the paging terminal 150 in response to a paging message. Referring now to FIGS. 7 and 8, a data record 160 for the data message contains the address data, which uniquely identifies a particular remote communications device 152, the acknowledgment code, which uniquely identifies the data message and the corresponding paging message, and paging data intended for communication to the subscriber that operates the selected remote communications device 152. Similar to standard paging systems, the address data within the field 162 preferably is associated with a particular CAP code or personal identification number (PIN) that has been assigned to the selected remote communications unit 152. The address data, acknowledgment code, and paging data are contained within separate data fields, respectively an address data field 162, an acknowledgment code field 164, an the paging data field 166. The data fields 162, 164, and 166 are preferably separated by one or more identifying characters or character strings to separate the information within those fields and to enable an accurate reading of such information.

A paging message is typically initiated when the paging party contacts the paging terminal 150 via the communications path 151, which is shown in FIG. 7 as a PSTN. The paging party then has the opportunity to supply the desired paging data, such a return telephone number, to the paging terminal 150 in a conventional manner, either by speaking to an operator, who will supply the paging data in the proper format to the paging terminal 150, or by inputting the paging data via telephone equipment. It will be appreciated that the paging message also can be initiated in response to a message transmitted via an electronic mail system.

Figure 9:
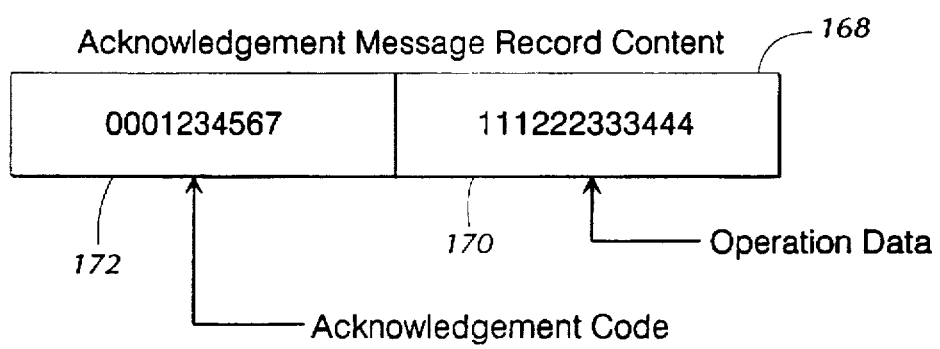
FIG. 9 is a table that shows the format for an acknowledgment message that is communicated via the preferred embodiment of the paging acknowledgment system.

For the successful acknowledgment of a paging message, a portion of the data message, specifically the acknowledgment code contained in the data field 164, should be returned to the paging terminal 150 via an acknowledgment message forwarded by the CMR system 8'. Accordingly, the format for the characters of the acknowledgment code is preferably compatible with the overall message format for the acknowledgment message. The data record for the acknowledgment message is shown in FIG. 9. Referring now to FIGS. 7 and 9, a data record 168 for the acknowledgment message contains separate fields for both user-entered data and the acknowledgment code. The field 170 for the user-entered data and the field 172 for the acknowledgment code are separated by a selected character set to identify the completion of the character string for the operation data and the start of the character string for the acknowledgment code. One or more characters can be appended to the end of the data record to indicate the end of the data message.

The data record 168 for the acknowledgment message is preferably identical to the message format for a conventional call origination signal transmitted by a cellular radiotelephone when it originates a cellular call for communication via a CMR system, such as the CMR system 8'. In particular, the data field 172 for the acknowledgment code corresponds to the location in a call origination signal for at least a portion of a mobile telephone number or MIN. The acknowledgment code preferably belongs to a set of conventional telephone numbers, a set of 10 digit numbers, or a set of unassigned mobile telephone numbers. The acknowledgment code also contains information that enables the MSC 24' to determine that the acknowledgment message has been transmitted by a source that is associated with the data collection system 40'.

For the preferred embodiment of the paging acknowledgment system 10', the subscriber that uses the remote communications device 152 has an option of supplying a response to a received data message. This response, which is referred to as operation data, is supplied by the user in a conventional manner by inputting the operation data via a keypad located along the remote communications device 152. Alternatively, a response to the received data message can be automatically supplied by the remote communications unit 152 without any action by the subscriber. The operation data typically comprises textual characters or binary data that are inserted within the data field 170 of the acknowledgment message data record 168.

The data field 170 for the operation data can correspond to the location within a data record of a conventional call origination signal for an ESN. For cellular systems that do not review or screen ESNs based upon the 8-bit manufacturer code segment, it is possible to use the entire 32 bit data field normally assigned to the ESN for operation data. However, if the cellular system screens the 8-bit field for the manufacturer code segment of the ESN, the operation data must fit within the remaining 24 bits of the data field normally assigned to the ESN. For most applications, it will not be necessary to manipulate the manufacturer's code segment of the ESN for data use because an acknowledgment message having 24 bits of operation data should be sufficient for the communication of a limited response in most applications. It will be appreciated that the use of only 24 bits of the ESN location for the placement of operation data within the acknowledgment message will permit over 16 million possible responses. Moreover, it will be appreciated that the data field normally reserved for Called Address information (not shown) in a call origination signal can be used for the storage of operation data.

The format for the acknowledgment message also can be modified to allow the insertion of both the acknowledgment code and the optional operation data within a data field that corresponds to the field for the ESN in a call origination signal. For this alternative message format, each data message is assigned an identifying acknowledgment code and each remote communications device 152 is assigned a unique mobile telephone number that serves to identify the transmitting cellular source. In response to a data message containing this type of acknowledgment code, the remote communications device 152 outputs an acknowledgment message which includes a data field containing its particular mobile telephone number and a data field containing both the acknowledgment code and the optional operation data. The acknowledgment code is preferably separated from the operation data within the same data field by one or more separating characters. The mobile telephone number in this acknowledgment message serves to identify the transmitting cellular source, specifically the particular remote communications device 152, and the acknowledgment code operates to identify the corresponding data message (and paging message). This acknowledgment message remains formatted to represent a call origination signal and the data fields correspond to locations for a MIN and an ESN.

Referring again to FIG. 7, in response to a data message, the remote communications device 152 either transmits the data message in an automated mode without subscriber intervention or in a manual mode controlled by the subscriber. By transmitting an acknowledgment message having a message format associated with the fields of a conventional call origination signal, the remote communications device 152 mimics the "call origination" function for a conventional cellular radiotelephone. To the MSC 24', the acknowledgment message appears to contain both a valid mobile telephone number and an ESN. Although the remote communications device 152 is merely attempting to send an acknowledgment as a data-type signal via the control channel instead of placing a conventional voice-based telephone call, the MSC 24' operates on the acknowledgment message as if it contained information found in the fields of a call origination signal. This enables communication of the acknowledgment code via the cellular network control channel 38 of the CMR system 8'.

In response to an acknowledgment message, the MSC 24' makes a determination whether the device that transmitted the signal is an authorized user or subscriber of the services offered by the CMR system 8'. This determination is based upon the acknowledgment code within the data record 172, which preferably corresponds to the MIN information for a call origination signal. At least a portion of the acknowledgment code indicates that the selected remote communications device 152 is associated with another "remote" cellular system. Based upon this information, the MSC 24' checks its database and determines that the remote communications device 152 subscribes to a remote cellular system, namely the data collection system 40', which represents a home location register. Accordingly, the MSC 24' determines that the source of the acknowledgment message should be treated as a roamer. Thus, it will be understood that the MSC 24' interprets the acknowledgment message as a transmission from a roaming mobile radiotelephone operating within the CMR system 8'.

The remote cellular system, which is identified by a portion of the acknowledgment code, is not an actual operating cellular system for supporting telephone conversations, but rather is dedicated to acknowledgment-based applications and is represented by the data collection system 40'. In recognition that the remote communications device 152 is associated with this remote cellular system, the MSC 24' forwards the acknowledgment message to the data collection system 40' via a first communications link 42'. The data collection system 40' responds by sending to the MSC 24' a validation message which confirms that the source of the acknowledgment message is associated with the data collection system 40' and that the MSC 24' should accept communications from that source. This validation message also preferably indicates that the MSC 24' should deny cellular voice-based communications privileges for this source because no voice-based call is actually associated with the acknowledgment message transmitted by the responsible remote communications device 152. This type of validation message prevents the MSC 24' from attempting to assign a cellular voice channel for use by the source of the acknowledgment message. It will be understood that the remote communications device 152 uses the format of the call origination signal to forward acknowledgment data rather than to initiate a cellular telephone call. In turn, the remote communications device 152 is added to a database of registered roamers at the MSC 24'.

The data collection system 40' can subsequently transmit a message to the MSC 24' via the link 42' that instructs the MSC to delete the remote communications device 152 from its list of registered roamers. This entry is deleted from the MSC database because it is no longer necessary to maintain the registration information concerning the remote communications device 152 after the transfer of the acknowledgment message to the data collection system 40'. Alternatively, the database entry for the registered remote communications device 152 is deleted by the MSC 24' upon the expiration of a time interval.

Unlike the MSC 24', the data collection system 40' recognizes that the acknowledgment message contains certain data which confirms that a selected remote communications device 152 has received a data message and has forwarded a response, specifically the acknowledgment message containing the acknowledgment code and the operation data. Accordingly, the data collection system 40' sends the acknowledgment code and the operation data via a communications link 174 to the paging terminal 150 to permit the paging terminal to update its acknowledgment records.

In turn, the paging terminal 150 can compare the acknowledgment code supplied by the data collection system 40' to its list of acknowledgment codes assigned to data messages (and corresponding paging messages). A successful match indicates that the intended recipient of the paging message, specifically a selected remote communications device 152, has received the data message and has forwarded an acknowledgment message to confirm the data message reception. Based upon this comparison, the paging terminal 150 stores acknowledgment information in a database or in a memory storage device to archive this acknowledgment of the paging message for access by the paging party. The paging terminal 150 can also store the operation data, if any, to permit access by the paging party to the response from the user of the selected remote communications device 152.

It will be understood that the data collection system 40' and the paging terminal 150 can be installed as separate systems located at different locations or as fully integrated equipment at the same site.

Although this description of the paging acknowledgment system refers to the use of the remote communications unit 152 by a subscriber to a paging service, it will be understood that the remote communications unit 152 also can supply paging information to equipment adapted to receive such paging information. For example, the transmission of the data message by the paging terminal 150 is useful for initiating an operation by the adapted equipment, such as the recording of data from a data source. In response to the data message, the adapted equipment also can supply operation data to the remote communications unit 152 for transmission via the cellular system 8' to a central collection site. If the equipment is primarily used for recording data, then the acknowledgment message transmitted by the remote communications unit 152 contains operation data including recorded data. Thus, the remote communications unit 152 can be connected to the adapted equipment via a hard-wired connection or a wireless link to permit the exchange of data messages and operation data.

Similar to the data message system 10, communications between the data collection system 40' and the MSC 24' are preferably compatible with the IS-41 standard. Accordingly, the MSC 24' can hand-off or forward the data message to the data collection system 40' via the first communications link 42', which is preferably implemented as an IS-41 network. However, it should also be understood that other devices and protocols are useful for implementing communications with the data collection system 40', including the Motorola DMX protocol and other vendor proprietary protocols.

Figure 10:
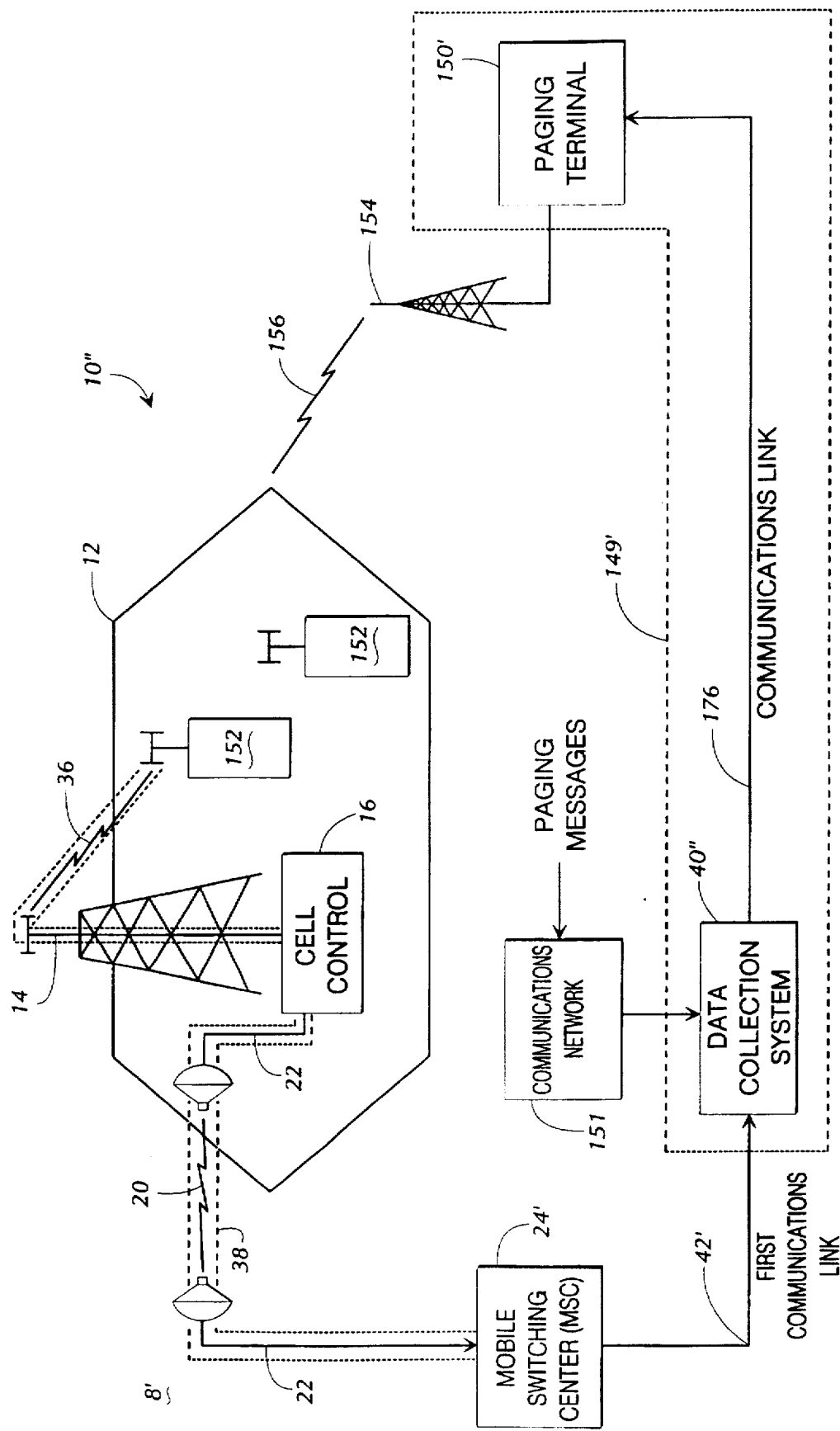
FIG. 10 is a block diagram of an alternative embodiment of the paging acknowledgment system.

For another embodiment 10" of the acknowledgment paging system, as shown in FIG. 10, a communications system 149' comprises a data collection system 40" and a paging terminal 150'. Referring to FIG. 10, the data collection system 40" accepts the paging messages via the communications network 151, such as the PSTN, rather than the paging terminal 150'. In response to a paging message, the data collection system 40" assigns an unique identifier to the paging message, specifically an acknowledgment code, and prepares a data packet for transmission to the paging terminal 150'. The data packet includes the following information: (1) the address that uniquely identifies the intended receiving device, (2) the acknowledgment code, and (3) the paging data. The paging terminal 150' receives the data packet via a communications link 176 and, in response, outputs via the radiopaging communications path 156 a data message corresponding to the data packet for reception by the selected remote communications device 152. The data collection system 40" also stores the acknowledgment code corresponding to the data packet (and the paging message) to permit a comparison of the stored acknowledgment code to an acknowledgment code in the acknowledgment messages forwarded by a remote communications unit 152 via the CMR system 8'. In view of the foregoing, it will be appreciated that the data collection system 40" shown in FIG. 10 conducts the acknowledgment operations (but not the conventional radiopaging operations) that are performed by the paging terminal 150 for the embodiment 10' shown in FIG. 7.

The communications between the paging terminal and the remote communications device 152, as well as the communications between the MSC 24' and the data collection system 40", are identical to the operations described for the embodiment shown in FIG. 7. Still referring to FIG. 10, the paging terminal 150' broadcasts the data message in a conventional radiopaging manner via the antenna 154 for reception by the selected remote communications device 152. In response, the selected remote communications device 152 "originates" a cellular call by outputting the acknowledgment message. Based upon at least a portion of the acknowledgment code in the acknowledgment message, the MSC 24' recognizes that the selected remote communications device 152 is associated with another cellular system, in this case the data collection system 40". Accordingly, the MSC 24' forwards the acknowledgment message to the data collection system 40" via the first communications link 42'.

By comparing the acknowledgment code in the acknowledgment message to the stored acknowledgment code assigned to the corresponding data message, the data collection system 40" recognizes that the data message was received by the selected remote communications device 152. Based upon this acknowledgment, the data collection system 40" deletes the assigned acknowledgment code from its database of transmitted data packets for which it is awaiting acknowledgment and thereafter takes whatever action is appropriate to provide an acknowledgment to the party who originated the page request. There is no need to forward the acknowledgment message to the paging terminal 150' because, for this embodiment, the paging terminal is implemented as a conventional radiopaging system that does not perform any acknowledgment operations.

Those persons skilled in the art will appreciate that the data collection system 40" and the paging terminal 150' can be separate systems located at different locations or can be installed at the same site as fully integrated equipment.

Figure 11:
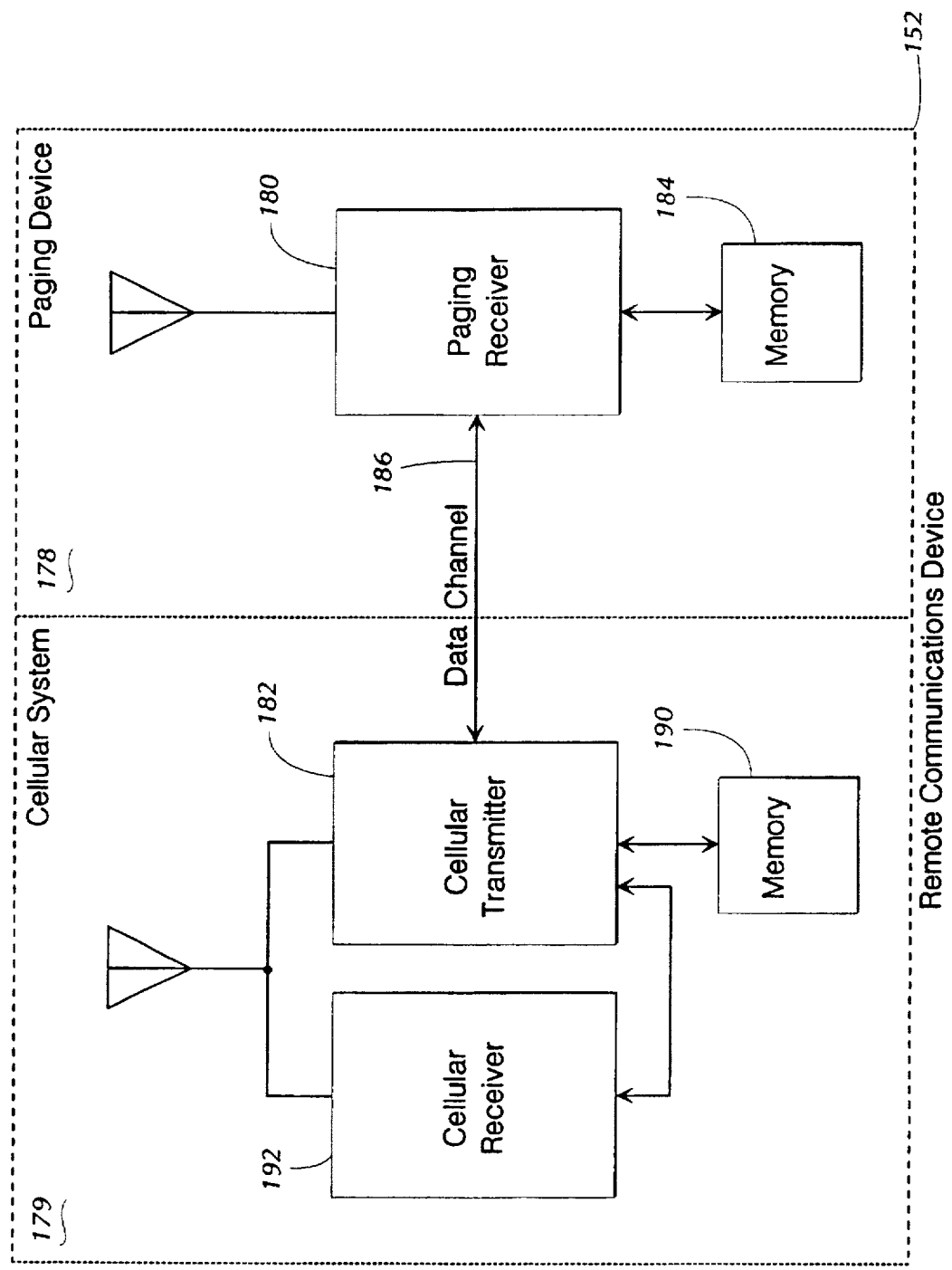
FIG. 11 is a block diagram of a remote communications device for use with the preferred embodiment of the paging acknowledgment system.

FIG. 11 is a block diagram that illustrates the components of the remote communications device 152. As shown in FIG. 11, the remote communications device 152 includes a radiopaging device 178 and a cellular device 179. For the preferred remote communications device 152, the radiopaging device 178 and the cellular device 179 are packaged within the same housing to facilitate convenient use of the device 152 by the typical mobile subscriber. The inventors envision that the device 152 will be portable and housed within a miniature package similar to present paging devices and radiotelephones. A battery is a preferred power source for the device 152 in view of the intended portable use of the device.

The radiopaging device 178 includes a paging receiver 180 that receives the data message from the paging terminal 150 via the radiopaging communications path 156 (FIG. 7). In turn the paging receiver 180 can store the acknowledgment code and the paging data within a memory storage device 184. In response to the data message, the paging receiver 180 outputs an alert to the user to advise of the reception of the data message and thereafter supplies the paging data to the user in a known manner, typically via a display (not shown) or as an audible message output via a speaker (not shown).

The paging receiver 180 also responds to the data message by outputting the acknowledgment code to the cellular transmitter 182 via a data channel 186 connected between the two devices. If the user responds to the data message by inputting operation data, the operation data is normally stored within the memory storage device 184 until it is transferred to the cellular transmitter 182 via the data channel 186. In view of the foregoing, it will be appreciated that the paging receiver 180 is a conventional radiopager that has been adapted to receive information associated with the acknowledgment process, namely the acknowledgment code. Thus, the paging receiver 180 must distinguish between the data fields in the data record 160 to insure that the paging receiver 180 properly recognizes and processes the information contained in the data message.

The cellular device 179 includes a cellular transmitter 182 that receives the acknowledgment code and the operation data over the data channel 186 and stores this information within a memory storage device 190. For an acknowledgment message transmission, the cellular transmitter 182 reads the acknowledgment code and the operation data from the memory storage device 190, prepares the acknowledgment message by placing this information within the data fields 170 and 172, and thereafter transmits the acknowledgment message via the control channel 38. To properly communicate with the MSC 24', the acknowledgment message transmissions by the cellular transmitter 182 are compatible with conventional cellular standards and protocols for the transfer of data signals (not voice signals) over a control channel. Accordingly, the cellular transmitter 182 can be implemented as a transmitter for a conventional radiotelephone unit, with the exception that the transmitter is adapted to accept the acknowledgment code and the operation data via the data channel 186. Indeed, by transmitting the acknowledgment message in response to the data message, the remote communications device 152 conducts an operation that is similar to a call origination operation performed by a standard radiotelephone. It will be appreciated that the cellular transmitter 186 can be implemented as a data-only cellular radiotelephone transmitter for communicating via the cellular network control channel 38 to avoid the costs associated with a conventional voice/control data-capable cellular mobile radiotelephone.

It will be understood that the cellular transmitter 182 only requires the capability to transmit on the data channels of a cellular network control channel, such as the control channel 38, because the system 10 does not use the voice channels for forwarding acknowledgment messages via the CMR system 8'. Accordingly, the cellular transmitter 182 should draw less power than a conventional radiotelephone that operates on both the voice and data channels of a cellular network control channel. In addition, the cellular transmitter 182 typically draws power only during data transmission intervals, thereby conserving the preferred power source, a battery. A typical acknowledgment message transmission occurs as a burst of data in the form of a data packet, thereby further reducing power consumption. Power conservation is significant to the convenient use of the remote communications device 152 because the device 152 is primarily intended for use by a mobile subscriber who does not have regular access to another type of power source. It will be appreciated that an alternative power source for the cellular transmitter 182 is a capacitor capable of storing sufficient energy to transmit the data bursts.

To receive communications from the MSC 24' via the control channel 38, the cellular device 152 also includes a cellular receiver 192 connected to the cellular transmitter 182. The cellular receiver 192 can be implemented as the cellular receiver for a conventional radiotelephone unit. However, similar to the cellular transmitter 182, the preferred cellular receiver 192 operates to receive information primarily via the data radio channels rather than the voice radio channels of the CMR system 8'.

Similar to the cellular communications device 34 (FIG. 3), the remote communications device 152 also can employ a form of acknowledgment message queuing that delays the transmission of the acknowledgment message until the control channel 38 is available for use on a noninterference basis. The remote communications unit 152 preferably monitors the busy idle bits on the control channel 38 to determine the level of control signal activity prior to transmission of acknowledgment messages. This minimizes the impact of transmission by one or more of the remote communications devices 152 within the cell 12 upon the normal control signals supplied via the control channel 38 to radiotelephone units operating within the cell.

Specifically, the cellular receiver 192 monitors the busy idle bits carried by the FOCC of the control channel 38 for sequential, predetermined time periods. In response to reception of the busy idle status signal, the remote communications unit 152 calculates and stores both a running average of the highest count of busy idle bits per time period and the last "n" count of busy idle bits per time period. To calculate the running average, a newly acquired count of busy idles bits per time period is averaged with a stored average if the count for the busy idle bits for the immediately preceding interval is higher than a value of one standard deviation lower than the stored average. Prior to transmitting an acknowledgment message via the control channel 38', the remote communications unit 152 will average the stored last "n" counts of busy idle bits per time period and compare that computed "n" average to the stored running average. If the computed "n" average drops below the stored running average, then the cellular transmitter 182 outputs the acknowledgment message via the RECC of the control channel 38'. However, if the computed "n" average exceeds the stored running average, then the cellular transmitter 182 will delay the transmission of the acknowledgment message.

Thus, the acknowledgment message transmission preferably occurs only when the control channel 38 is available for clear use by the remote communications device 152. It will be understood that this message cueing technique may delay the transmission of the acknowledgment message if the control channel 38 is busy.

Figure 12:
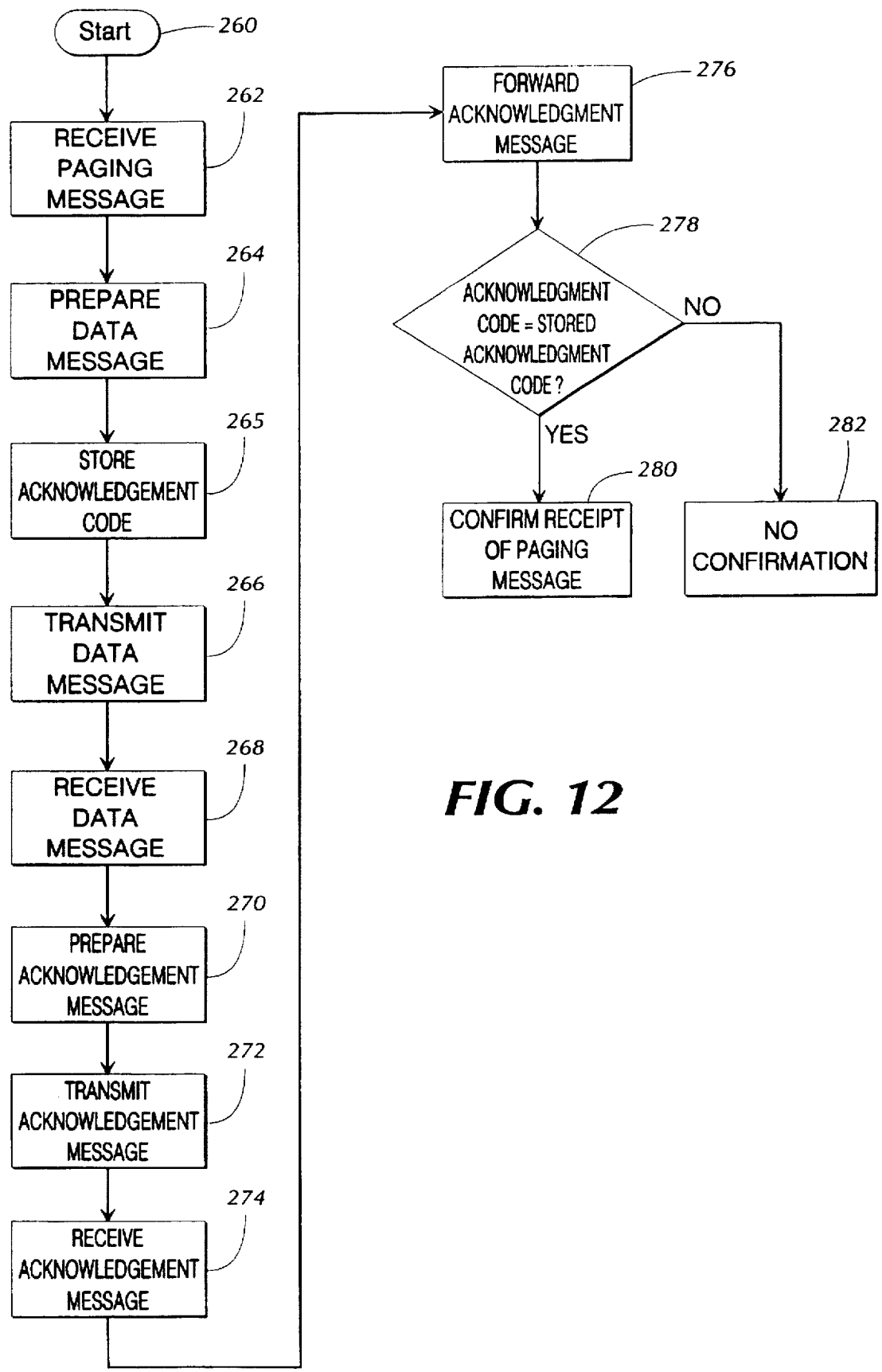
FIG. 12 is a flow chart diagram that shows the steps for a method of communicating an acknowledgment message via the preferred embodiment of the paging acknowledgment system.

FIG. 12 is a flow chart diagram that shows the preferred steps for a method for communicating an acknowledgment message via a cellular network control channel of a CMR system in response to a paging message. Referring to FIGS. 12, the method starts at the START block 260 and, at step 262, a paging message is received from a paging party, i.e., the party responsible for originating the paging message. The paging party typically originates the paging message via the communications network 151. A data message corresponding to the paging message is prepared in step 264. In particular, an acknowledgment code is added to the address data and the page data previously supplied by the paging message. In step 265, the acknowledgment code associated with the data message (and the paging message) is stored for use during a subsequent acknowledgment operation. The data message is then transmitted by a paging terminal in step 266.

In step 268, the data message is received by a selected cellular device, such as a selected remote communications unit having the particular address contained in the data message. In response, an acknowledgment message is prepared during step 270. The acknowledgment message includes the acknowledgment code taken from the data message and any operation data input by the subscriber. In step 272, the acknowledgment message is transmitted to the MSC via the cellular network control channel of the CMR system.

The MSC receives the acknowledgment message at step 274 and, based upon at least a portion of the acknowledgment code in the acknowledgment message, forwards the acknowledgment message to a data collection system in step 276. At step 278, an inquiry is conducted to determine whether the acknowledgment code in the acknowledgment message is identical to a previously stored acknowledgment code associated with a particular data message (see step 265). If the answer is positive, then the "YES" branch is followed to step 280, in which an acknowledgment confirming the receipt of the paging message is supplied to the paging party. In contrast, if the response is negative, then the "NO" branch is followed to step 282. In step 282, the paging party is advised that an acknowledgment has not been received in response to the paging message.

In summary, the present invention provides a system for communicating data via a cellular network control channel of a CMR system. A data message system for communicating data collected from remote data sources includes sets of reporting devices, MSC of the CMR system, and a data collection system connected to said MSC via a first communications link. Each recording device monitors a remote data source to obtain selected data and thereafter transmits a data message containing the selected data. The data message is formatted to correspond to a call origination message used by a conventional cellular mobile radiotelephone for initiating a cellular telephone call. The MSC receives data messages via the cellular network control channel from reporting devices operating within coverage areas of the array of cells and forwards the data messages via the first communications link to the data collection system. In response, the data collection system stores the data messages and processes the selected data.

The present invention also provides a paging acknowledgment system is also provided for communicating both (1) paging messages and (2) acknowledgment messages to confirm reception of the paging messages. The paging acknowledgment system includes at least one communications system, remote communications devices, and an MSC of a CMR system. In response to a paging message from a paging party, the communications system transmits data messages corresponding to the paging message via a conventional radiopaging communications path. The data message contains the type of data that is normally supplied with a conventional paging message and an acknowledgment code that uniquely identifies said data message. A remote communications device responds to a data message containing its particular address by transmitting an acknowledgment message containing the acknowledgment code to the MSC via a cellular network control channel of the CMR system. The acknowledgment message is formatted to correspond to a call origination message used by a conventional cellular mobile radiotelephone for initiating a cellular telephone call. The MSC forwards the acknowledgment message to the communications system via a first communications link. The communications system confirms reception of the data message by comparing the acknowledgment code of the acknowledgment message to the acknowledgment codes associated with the paging messages.

By operating within the environment of a CMR system, which is well adapted for portable or mobile communications, the present invention takes advantage of an existing wide area communications network and avoids the expense of communicating with each remote data site or combined pager/cellular device via a dedicated conventional telephone facility or conventional two-way radios. To conserve the use of voice channels of the CMR system for conventional telephone conversations, the present invention uses the cellular network control channel of the CMR system for data communications. This permits conservation of the valuable frequency spectrum dedicated to the voice channels of the typical CMR system.

It should be understood that the particular embodiments described herein have been disclosed by way of example and that other modifications may occur to those skilled in the art without departing from the scope and spirit of the appended claims.

We claim:

1. In or for a cellular mobile radiotelephone (CMR) system having an array of cells for communicating with cellular mobile radiotelephones within coverage areas of said array of cells, a data message system for communicating selected data collected from a plurality of remote data sources, said data message system comprising:

a plurality of data reporting means, each of said data reporting means operative for monitoring a corresponding one of said remote data sources to obtain said selected data and for transmitting a data message containing said selected data;

a mobile switching center (MSC) for receiving said data message via a cellular network control channel from each of said data reporting means operating within said coverage areas of said array of cells; and data collection means for collecting said selected data in response to receiving said data message from said MSC via a first communications link, said data message formatted as a call origination signal transmitted by one of the cellular mobile radiotelephones when said cellular mobile radiotelephone originates a cellular telephone call for communication via said CMR system.

2. The apparatus of claim 1, wherein said data collection means is operative to transmit said data message to a data processing system via a second communications link, said data processing system being operative to process said selected data of said data message.

3. The apparatus of claim 1, wherein said data message comprises said selected data and a predetermined identifying characteristic which uniquely identifies a certain one of said data reporting means that transmits said data message to said MSC.

4. The apparatus of claim 3, wherein said call origination signal comprises data fields for a mobile telephone number and an electronic serial number (ESN), said predetermined identifying characteristic corresponding to at least a portion of said mobile telephone number and said selected data corresponding to at least a portion of said ESN.

5. The apparatus of claim 1, wherein said data reporting means generates a status signal representing the occurrence of an event in the environment of said corresponding remote data source, said data reporting means responsive to said status signal to transmit said data message to said MSC.

6. The apparatus of claim 1, wherein said data reporting means monitors said cellular network control channel to detect a stream of busy idle bits for a predetermined time period, each of said busy idle bits indicating whether a cellular source has initiated a cellular communication with said MSC via said cellular network control channel, determines the level of communications for said cellular network control channel based upon the status of said busy idle bits, and transmits said data message to said MSC when said level for said communications is below a certain minimum threshold.

7. The apparatus of claim 1, wherein said data reporting means conducts predetermined operations in response to receiving command signals from said MSC via said cellular network control channel.

8. The apparatus of claim 7, wherein a selected one of said data reporting means transmits said data message to said MSC via said cellular network control channel in response to receiving one of said command signals via said cellular network control channel.

9. The apparatus of claim 7, wherein a selected one of said data reporting means monitors said corresponding remote data source and obtains said selected data for a certain monitoring time period in response to receiving one of said command signals via said cellular network control channel.

10. The apparatus of claim 1, wherein said data reporting means includes a clock that outputs a clock signal upon expiration of a time interval, said data reporting means operative to transmit a certain data message containing said stored selected data to said MSC via said cellular network control channel in response to said clock signal.

11. In or for a cellular mobile radiotelephone system (CMR) having an array of cells for communicating with cellular mobile radiotelephones within coverage areas of said array of cells, a paging acknowledgment system for communicating paging messages and acknowledgments to confirm reception of said paging messages, said paging acknowledgment system comprising:

a communications system, responsive to said paging messages, for preparing data messages corresponding to said paging messages and transmitting said data messages via a radiopaging communications path;

a plurality of remote communications devices for receiving said data messages via said radiopaging communications path, each of said data messages containing an address that uniquely identifies one of said remote communications devices, each of said remote communications device responsive to a selected one of said data messages containing its associated address for transmitting via a cellular network control channel of said CMR system an acknowledgment message that confirms reception of said selected data message, said acknowledgment message formatted to correspond to a call origination signal transmitted by one of the cellular mobile radiotelephones when said cellular mobile radiotelephone originates a cellular telephone call for communication via said CMR system;

at least one mobile switching center (MSC) for receiving said acknowledgment message via said cellular network control channel from each of said remote communications devices; and said communications system further operative to receive said acknowledgment message from said MSC via a first communications link and to process said acknowledgment message to determine whether said acknowledgment message corresponds to a particular one of said data messages.

12. The apparatus of claim 11, wherein said communications system, responsive to a determination that said acknowledgment message corresponds to said particular data message, outputs a confirmation message to a paging party who initiated one of said paging messages corresponding to said particular data message, said confirmation message supplying verification of reception of said selected data message by said remote communications device.

13. The apparatus of claim 12, wherein each of said data messages corresponds to one of said paging messages and comprises said address that uniquely identifies a selected one of said remote communications devices, an acknowledgment code that uniquely identifies said corresponding paging message, and paging data supplied by a paging party who initiated said corresponding paging message and intended for communication to a user associated with said selected remote communications device, and said acknowledgment message comprises said acknowledgment code and operation data supplied by said user and intended for communication to said paging party.

14. The apparatus of claim 13, wherein said call origination signal comprises a mobile telephone number and an electronic serial number (ESN), said acknowledgment code corresponding to at least a portion of said mobile telephone number and said operation data corresponding to at least a portion of said ESN.

15. The apparatus of claim 13, wherein communications system is further operative to assign said acknowledgment code to each of said data messages and to output said acknowledgment code to a memory storage device for storage as a stored acknowledgment code.

16. The apparatus of claim 15, wherein said communications system determines whether said acknowledgment message corresponds to said particular data message by comparing said acknowledgment code contained in said acknowledgment message to said stored acknowledgment code associated with said particular data message.

17. The apparatus of claim 11, wherein each of said remote communications devices monitors said cellular network control channel to detect a stream of busy idle bits for a predetermined time period, each of said busy idle bits indicating whether a cellular source has initiated a cellular communication with said MSC via said cellular network control channel during a particular time interval, determines the level of communications for said cellular network control channel based upon the status of said busy idle bits, and transmits said acknowledgment message to said MSC when said level for said communications is below a certain minimum threshold.

18. The apparatus of claim 11, wherein said remote communications devices include a clock that outputs a clock signal upon expiration of a time interval, said remote communications devices responsive to said clock signal to transmit said acknowledgment message to said MSC.

19. In or for a cellular mobile radiotelephone (CMR) system for communicating with cellular mobile radiotelephones within coverage areas of said array of cells, a method for communicating data collected from a plurality of remote data sources, comprising the steps of:

monitoring the operation of each of said remote data sources to obtain selected data;

transmitting a data message containing said selected data via a cellular network control channel to a mobile switching center (MSC) of said CMR system, said data message formatted to correspond to a call origination signal transmitted by one of the cellular mobile radiotelephones when said cellular mobile radiotelephone originates a cellular telephone call to communicate via said CMR system; and transmitting said data message from said MSC to a data collection system via a first communications link, said data collection system operative to collect said selected data in response to said data message.

20. The method of claim 19 further comprising the step of transmitting said data message from said data collection system to a data processing system via a second communications link, said data processing system being operative to process said selected data of said data message.

21. The method of claim 19, wherein said data message comprises said selected data and a predetermined identifying characteristic that uniquely identifies a cellular communications device that transmits said data message to said MSC.

22. The method of claim 21, wherein said call origination signal comprises a mobile telephone number and an electronic serial number (ESN), said predetermined identifying characteristic corresponding to at least a portion of said mobile telephone number.

23. The method of claim 19, wherein said monitoring step comprises:

monitoring said selected data for one of said remote data sources; and recording said selected data during at least one predetermined time period.

24. The method of claim 23, wherein said monitoring step further comprises adding to said selected data a time tag indicating the relative time for the start of each of said predetermined time period.

25. The method of claim 19, further comprising the steps of:

monitoring said cellular network control channel for a predetermined time period to detect a stream of busy idle bits, each of said busy idle bits indicating whether a cellular source has initiated a cellular communication with said MSC via said cellular network control channel during a particular time interval;

calculating the level of communications for said cellular network control channel based upon the status of said busy idle bits; and delaying said step of transmitting said data message to said MSC until said level of said communications is below a certain minimum threshold.

26. The method of claim 19, further comprising the step of conducting predetermined operations in response to receiving command signals from said MSC via said cellular network control channel.

27. The method of claim 26 further comprising the step of transmitting said data message to said MSC via said cellular network control channel in response to receiving one of said command signals.

28. The method of claim 26 further comprising the steps of:

outputting an instruction signal in response to receiving one of said command signals from said MSC via said cellular network control channel; and monitoring said remote data source in response to said instruction signal to obtain said selected data for a certain monitoring time period.

29. The method of claim 19 wherein said step of transmitting said data message to said MSC comprises:

outputting a clock signal upon expiration of a time interval; and transmitting one of said data messages to said MSC via said cellular network control channel in response to said clock signal.

30. The method of claim 29 further comprising the step of synchronizing said time interval of said clock signal to a certain time in response to receiving another one of said command signals from said MSC via said cellular network control channel.

31. In or for a cellular mobile radiotelephone (CMR) system for communicating with cellular mobile radiotelephones within coverage areas of said array of cells, a method for communicating acknowledgment messages to confirm reception of paging messages, each of said paging messages generated by a paging party for communication to a paged party, said method comprising the steps of:

receiving a particular one of said paging messages from said paging party;

preparing a data message in response to receiving said particular paging message, said data message corresponding to said particular paging message;

transmitting said data message via a radiopaging communications path;

preparing an acknowledgment message in response to receiving said data message via said radiopaging communications path, to confirm reception of said data message, said acknowledgment message formatted to correspond to a call origination signal transmitted by a cellular mobile radiotelephone when said cellular mobile radiotelephone originates a cellular telephone call to communicate via said CMR system;

transmitting said acknowledgment message via a cellular network control channel of said CMR system to a mobile switching center (MSC); and processing said acknowledgment message to determine whether one of said acknowledgment messages corresponds to said data message.

32. The method of claim 31 further comprising the step of outputting a confirmation message in response to determining that said acknowledgment message corresponds to said data message, said confirmation message supplying verification of reception of said data message.

33. The method of claim 32, wherein said data message comprises an address that uniquely identifies a selected remote communications unit for receiving said data message, an acknowledgment code that uniquely identifies said corresponding paging message, and paging data supplied by a paging party who initiated said corresponding paging message and intended for communication to said paged party.

34. The method of claim 33, wherein said acknowledgment message comprises said acknowledgment code and operation data supplied by said paged party and intended for communication to said paging party.

35. The method of claim 34, wherein said call origination signal comprises a mobile telephone number and an electronic serial number (ESN), said acknowledgment code corresponding to at least a portion of said mobile telephone number and said operation data corresponding to at least a portion of said modified ESN.

36. The method of claim 31, wherein said step transmitting said acknowledgment message comprises:

monitoring said cellular network control channel for a predetermined time period to detect a stream of busy idle bits, each of said busy idle bits indicating whether a cellular source has initiated a cellular communication with said MSC via said cellular network control channel during a particular time interval;

calculating the level of communications for said cellular network control channel based upon the status of said busy idle bits; and delaying said step of transmitting said acknowledgment message to said MSC until said level for said predetermined time period is below a certain minimum threshold.

37. The method of claim 31, wherein said step of transmitting said acknowledgment message comprises:

outputting a clock signal upon expiration of a time interval; and transmitting said acknowledgment message in response to said clock signal.

* * * * *